(12) United States Patent  (10) Patent No.: US 9,203,570 B2
Sato et al.  (45) Date of Patent: Dec. 1, 2015

(54) COMMUNICATION APPARATUS AND COMMUNICATION METHOD

(75) Inventors: Yoshizo Sato, Daito (JP); Takafumi Koga, Daito (JP); Takeo Miyata, Daito (JP)

(73) Assignee: KYOCERA Corporation, Kyoto (JP)

( * ) Notice: Subject to any disclaimer, the term of this patent is extended or adjusted under 35 U.S.C. 154(b) by 505 days.

(21) Appl. No.: 13/522,005

(22) PCT Filed: Jan. 17, 2011

(86) PCT No.: PCT/JP2011/050651
§ 371 (c)(1),
(2), (4) Date: Jul. 12, 2012

(87) PCT Pub. No.: WO2011/087121
PCT Pub. Date: Jul. 21, 2011

(65) Prior Publication Data
US 2012/0287788 A1  Nov. 15, 2012

(30) Foreign Application Priority Data
Jan. 15, 2010  (JP) ................................ 2010-006453

(51) Int. Cl.
*H04L 5/00* (2006.01)
*H04B 7/06* (2006.01)
(Continued)

(52) U.S. Cl.
CPC ............ *H04L 5/0023* (2013.01); *H04B 7/0413* (2013.01); *H04B 7/0689* (2013.01);
(Continued)

(58) Field of Classification Search
CPC .. H04B 7/0413; H04B 7/0697; H04B 7/0689; H04B 7/0604
See application file for complete search history.

(56) References Cited

U.S. PATENT DOCUMENTS

2006/0128309 A1  6/2006  Dateki et al.
2007/0183320 A1*  8/2007  Chen et al. ................... 370/229
(Continued)

FOREIGN PATENT DOCUMENTS

JP  2002-058061 A  2/2002
JP  2004-072624 A  3/2004
(Continued)

OTHER PUBLICATIONS

International Search Report dated Feb. 15, 2011, issued for International Application No. PCT/JP2011/050651.
(Continued)

*Primary Examiner* — Huy D Vu
*Assistant Examiner* — Bao G Nguyen
(74) *Attorney, Agent, or Firm* — Procopio, Cory, Hargreaves & Savitch LLP

(57) ABSTRACT

A setting unit sets a communication mode for different one or more counterpart communication apparatuses to a non-spatial multiplexing mode or a spatial multiplexing mode. Setting unit switches the setting of the communication mode for the different one or more counterpart communication apparatuses from the non-spatial multiplexing mode to the spatial multiplexing mode, on the basis of a capability of a communication system having an own apparatus and the different one or more counterpart communication apparatuses. A transmitting unit processes a transmitting signal to the different one or more counterpart communication apparatuses to output the processed signal to a plurality of antennas, on the basis of the set communication mode.

20 Claims, 17 Drawing Sheets

(51) Int. Cl.
*H04B 7/04* (2006.01)
*H04L 1/00* (2006.01)
*H04W 72/04* (2009.01)

(52) U.S. Cl.
CPC ............ *H04B7/0697* (2013.01); *H04L 5/0055* (2013.01); *H04L 5/0057* (2013.01); *H04L 1/0026* (2013.01); *H04L 5/006* (2013.01); *H04L 5/0046* (2013.01); *H04L 5/0053* (2013.01); *H04W 72/046* (2013.01)

(56) References Cited

U.S. PATENT DOCUMENTS

| | | | |
|---|---|---|---|
| 2008/0008146 A1* | 1/2008 | Oikawa | 370/338 |
| 2008/0013504 A1 | 1/2008 | Nishibayashi et al. | |
| 2008/0095263 A1* | 4/2008 | Xu et al. | 375/295 |
| 2009/0213955 A1 | 8/2009 | Higuchi et al. | |
| 2009/0247093 A1 | 10/2009 | Saito | |
| 2010/0203916 A1* | 8/2010 | Tiwari et al. | 455/513 |
| 2011/0032832 A1* | 2/2011 | Jalali et al. | 370/252 |
| 2011/0243265 A1 | 10/2011 | Dateki et al. | |

FOREIGN PATENT DOCUMENTS

| | | |
|---|---|---|
| JP | 2005-094255 A | 4/2005 |
| JP | 2006-173834 A | 6/2006 |
| JP | 2008-022173 A | 1/2008 |
| JP | 2009-021935 A | 1/2009 |
| JP | 2009-038447 A | 2/2009 |
| JP | 2009-253379 A | 10/2009 |
| JP | 2009-273186 A | 11/2009 |
| JP | 2009-542164 A | 11/2009 |
| WO | 2006/106613 A1 | 10/2006 |
| WO | 2008/003087 A2 | 1/2008 |

OTHER PUBLICATIONS

Office Action dated Jun. 5, 2014, issued in counterpart Chinese application No. 2011-80006112.2.

* cited by examiner

FIG.4

| COMMUNICATION LEVEL | MIMO | MCS | TRANSMISSION RATE (BIT/SLOT) |
|---|---|---|---|
| 1 | MATRIX-A | QPSK 1/2 | D1 |
| 2 | MATRIX-A | QPSK 3/4 | D2 |
| 3 | MATRIX-A | 16QAM 1/2 | D3 |
| 4 | MATRIX-A | 16QAM 3/4 | D4 |
| 5 | MATRIX-A | 64QAM 1/2 | D5 |
| 6 | MATRIX-A | 64QAM 2/3 | D6 |
| 7 | MATRIX-A | 64QAM 3/4 | D7 |
| 8 | MATRIX-A | 64QAM 5/6 | D8 |
| 9 | MATRIX-B | 64QAM 1/2 | D9 |
| 10 | MATRIX-B | 64QAM 2/3 | D10 |
| 11 | MATRIX-B | 64QAM 3/4 | D11 |
| 12 | MATRIX-B | 64QAM 5/6 | D12 |

COMMUNICATION APPARATUS AND COMMUNICATION METHOD

TECHNICAL FIELD

The present invention relates to a communication apparatus and a communication method. Particularly, the present invention relates to a communication apparatus and a communication method each allowing spatial multiplexing for a transmitting signal.

BACKGROUND ART

In various radio communication systems for WiMAX (Worldwide Interoperability for Microwave Access) (registered trademark), next generation PHS (Personal Handy-Phone System), LTE (Long Term Evolution) and the like, a communication technology in which both of a transmitting side and a receiving side include a plurality of antennas, that is, MIMO (Multiple Input Multiple Output) has been employed for improving throughput and frequency utilization efficiency.

Examples of MIMO to be employed in a downlink communication mode from a radio base station to a radio terminal include an STC (Space-Time Coding) base and an SM (Spatial Multiplex) base (for example, refer to Patent Literature 1 (Japanese Patent Laying-Open No. 2009-273186)).

According to the STC base, the radio base station places (i.e., codes) one signal stream on the basis of a certain rule with regard to time and space (antenna) and transmits the coded signal stream through a plurality of antennas. In WiMAX, this STC base downlink communication mode is called DL MIMO MATRIX-A.

On the other hand, according to the SM base, the radio base station multiplex-transmits a plurality of signal streams through a plurality of antennas at a single frequency. In WiMAX, this SM base downlink communication mode is called DL MIMO MATRIX-B.

Depending on conditions of a transmission path, the radio terminal is occasionally improved in throughput characteristic and area characteristic, further, frequency utilization efficiency by employing the DL-MIMO communication mode based on the space-time coding mode (DL MIMO MATRIX-A) or the radio terminal is occasionally improved in throughput characteristic and area characteristic, further, frequency utilization efficiency by employing the DL-MIMO communication mode based on the spatial multiplexing mode (DL MIMO MATRIX-B). Typically, the switchover from the space-time coding mode to the spatial multiplexing mode is performed in a case where the condition of the transmission path is favorable.

CITATION LIST

Patent Literature

PTL 1: Japanese Patent Laying-Open No. 2009-273186

SUMMARY OF INVENTION

Technical Problem

However, this switchover is occasionally failed because of a change of a condition of a transmission path, an antenna characteristic of a radio terminal, and the like. If the switchover is failed, the switchover to the space-time coding mode is performed again. The repeated switchover results in loss of data, so that throughput is degraded.

Even in a case where the condition of the transmission path is favorable, occasionally, there is no necessity to perform the switchover from the space-time coding mode to the spatial multiplexing mode. For example, in a case where required throughput can be realized even in the space-time coding mode, there is no necessity to perform the switchover to the spatial multiplexing mode.

Hence, it is an object of the present invention to provide a communication apparatus and a communication method each capable of performing switchover from a non-spatial multiplexing mode to a spatial multiplexing mode only in a required case.

Solution to Problem

In order to solve the problems described above, a communication apparatus according to the present invention includes: a plurality of antennas; a setting unit for setting a communication mode for different one or more counterpart communication apparatuses to a non-spatial multiplexing mode or a spatial multiplexing mode; and a transmission processing unit for processing a transmitting signal to the different one or more counterpart communication apparatuses to output the processed signal to the plurality of antennas, on the basis of the set communication mode. Herein, the setting unit switches the setting of the communication mode for the different one or more counterpart communication apparatuses from the non-spatial multiplexing mode to the spatial multiplexing mode, on the basis of a capability of a communication system having the own apparatus and the different one or more counterpart communication apparatuses.

Advantageous Effects of Invention

According to the present invention, it is possible to perform switchover from a non-spatial multiplexing mode to a spatial multiplexing mode only in a required case.

BRIEF DESCRIPTION OF DRAWINGS

FIG. 4 is a diagram for illustrating a communication level.

DESCRIPTION OF EMBODIMENTS

Hereinafter, embodiments of the present invention will be described with reference to the drawings.
(Configuration of Radio Communication System)

Figure 1:
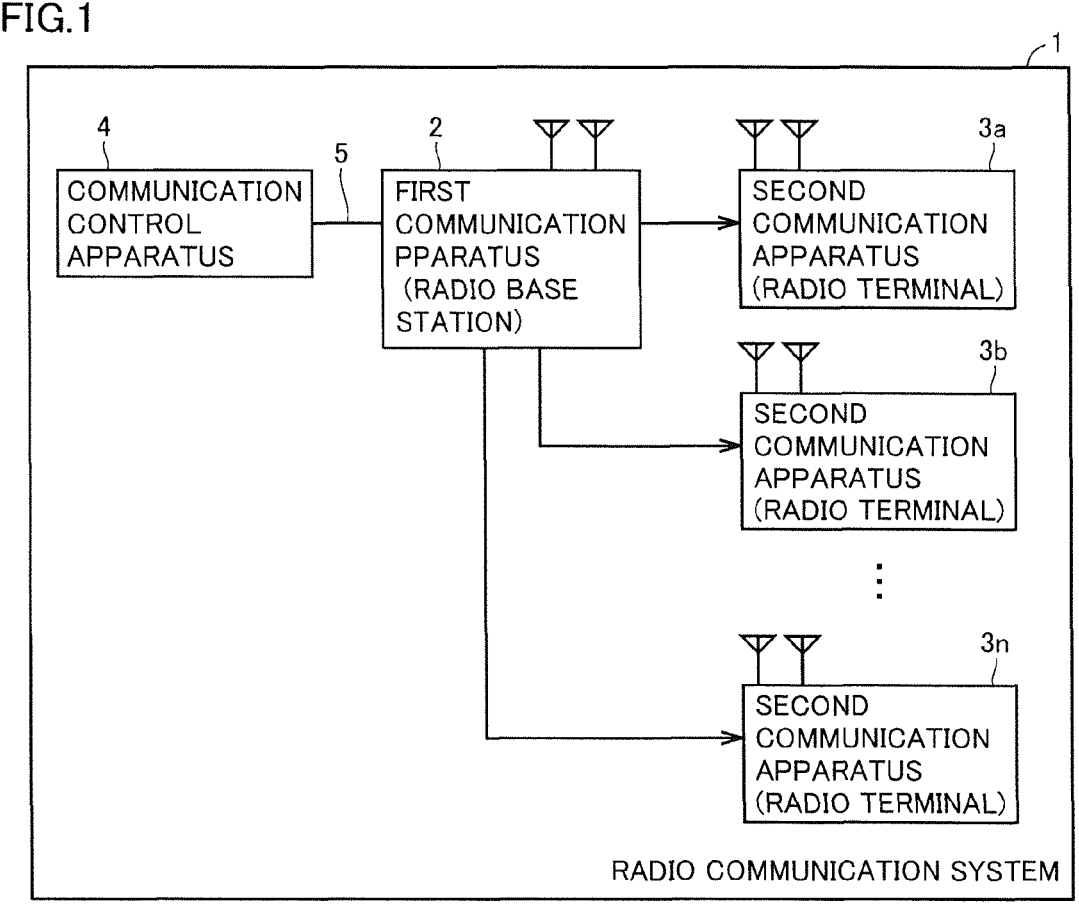
FIG. 1 is a diagram showing a configuration of a radio communication system according to one embodiment of the present invention.

FIG. 1 is a diagram showing a configuration of a radio communication system according to one embodiment of the present invention.

With reference to FIG. 1, the radio communication system has a first communication apparatus 2, and "n" second communication apparatuses 3a to 3n. A downlink signal of user data is transmitted between first communication apparatus 2 and "n" second communication apparatuses 3a to 3n in accordance with a DL-MIMO communication mode based on a space-time coding mode (DL MIMO MATRIX-A) or a DL-MIMO communication mode based on a spatial multiplexing mode (DL MIMO MATRIX-B). Hereinafter, a second communication apparatus denoted with reference sign 3 represents one of second communication apparatuses 3a to 3n.

First communication apparatus 2 may be, for example, a radio base station, and each of second communication apparatuses 3a to 3n may be, for example, a radio terminal. The radio base station allows simultaneous communication with plural ones of the "n" radio terminals.

First communication apparatus (radio base station) 2 is connected to a communication control apparatus 4 via a cable network 5. Communication control apparatus 4 transmits user data to be sent to second communication apparatuses 3a to 3n being in communication with first communication apparatus (radio base station) 2 to first communication apparatus (radio base station) 2 via network 5.
[First Embodiment]

In a first embodiment, a DL-MIMO communication mode of at least one radio terminal is switched to MATRIX-B in a case where there is data which cannot be transmitted even by complete use of all radio resources.
(Configuration of Radio Base Station)

Figure 2:
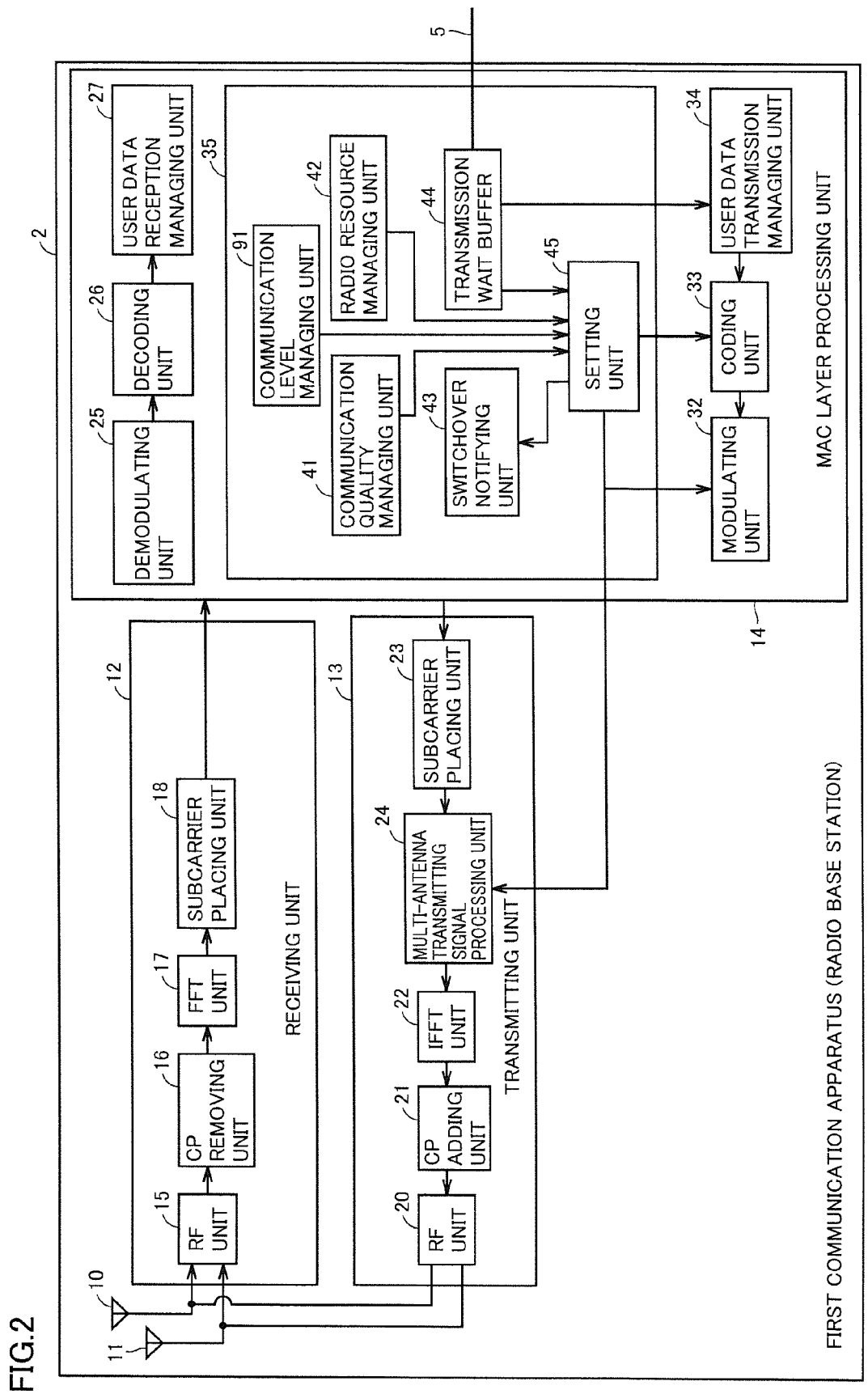
FIG. 2 is a diagram showing a configuration of a radio base station according to a first embodiment of the present invention.

FIG. 2 is a diagram showing a configuration of the radio base station according to the first embodiment of the present invention.

With reference to FIG. 2, radio base station 2 includes a first antenna 10, a second antenna 11, a transmitting unit 13, a receiving unit 12 and an MAC (Media Access Control) layer processing unit 14.

Transmitting unit 13 includes a multi-antenna transmitting signal processing unit 24, a subcarrier placing unit 23, an IFFT (Inverse First Fourier Transform) unit 22, a CP (Cyclic Prefix) adding unit 21 and an RF (Radio Frequency) unit 20.

Subcarrier placing unit 23 places a subcarrier on the basis of, for example, PUSC (Partial Usage of Subchannels).

Multi-antenna transmitting signal processing unit 24 performs space-time coding (e.g., Alamouti coding) on one data stream in a case where a set DL-MIMO communication mode is MATRIX-A, and performs spatial multiplexing on a plurality of data streams in a case where the set DL-MIMO communication mode is MATRIX-B.

Figure 3:
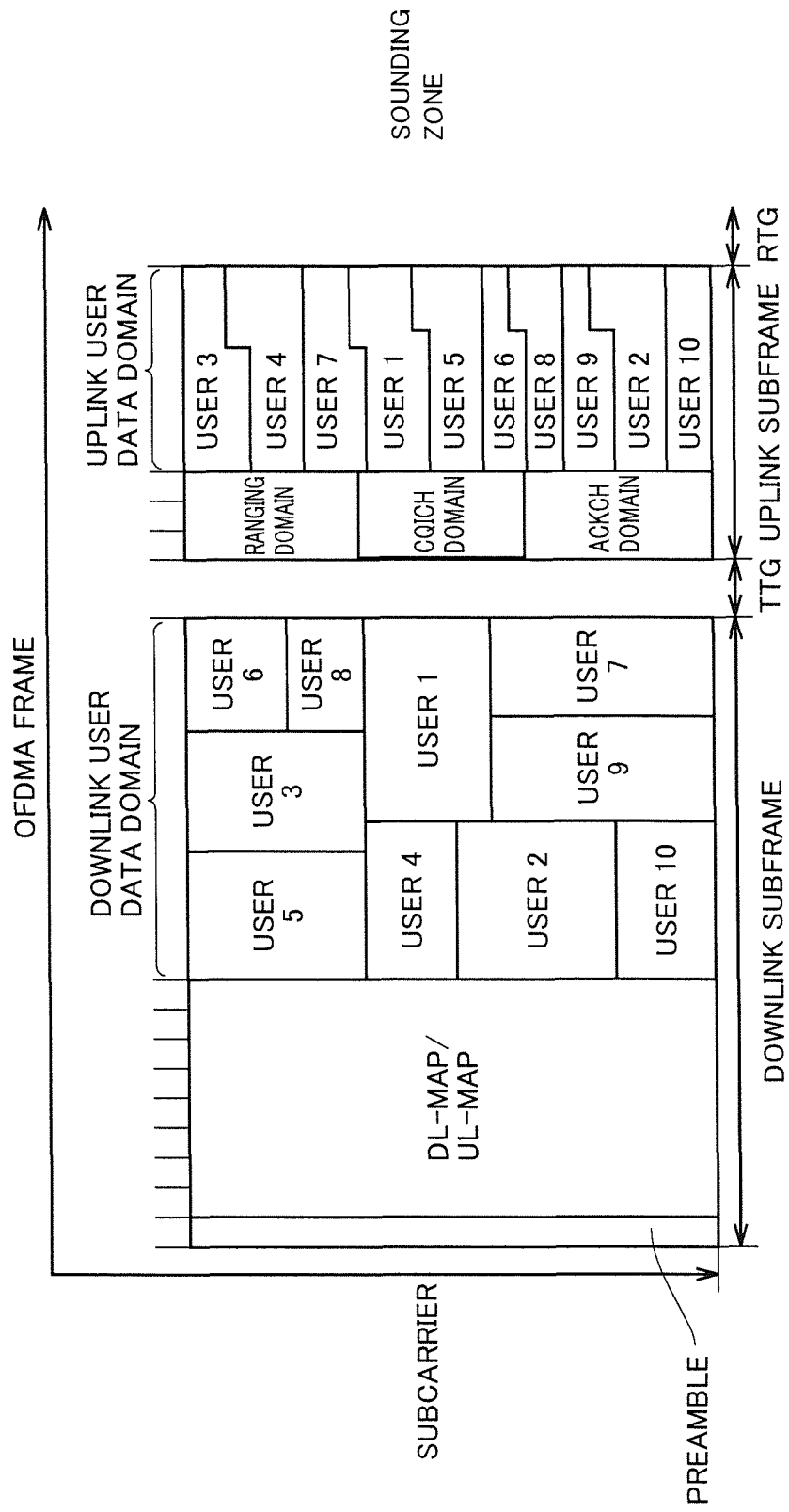
FIG. 3 is a diagram showing a configuration of OFDMA.

FIG. 3 is a diagram showing a configuration of an OFDMA frame.

With reference to FIG. 3, the OFDMA frame includes a downlink subframe and an uplink subframe.

The downlink subframe includes a preamble, a DL-MAP, an UL-MAP and a downlink user data domain.

In the preamble, a known signal is placed in order to establish synchronization.

In the DL-MAP (Downlink Map), allocation information of a down radio resource is placed. For example, information about a downlink user data domain and a MCS of down user data is placed in the DL-MAP.

In the UL-MAP (Uplink Map), allocation information of an up radio resource is placed. For example, information about an uplink user data domain and a MCS of up user data is placed in the UL-MAP.

In the downlink user data domain, down user data is placed. The downlink user data domain is configured with a plurality of slots. FIG. 3 shows a state that ten users occupy the downlink user data domain and there is no empty slot.

The uplink subframe includes a ranging domain, a CQICH (Channel Quality Information Channel) domain, an ACKCH (Acknowledgement Channel) domain and an uplink user data domain.

In the ranging domain, a ranging signal is placed.

In the CQICH region, a signal indicating a channel quality is placed.

In the ACKCH domain, a signal indicating a channel conformation response is placed.

In the uplink user data domain, up user data is placed.

With reference to FIG. 2 again, IFFT unit 22 transforms a plurality of subcarrier signals (frequency domain signals) to be output from multi-antenna transmitting signal processing unit 24 to time domain signals (OFDMA (Orthogonal Frequency Division Multiple Access) symbols) by IFFT.

CP adding unit 21 adds, as a CP, the same signal as a trailing end of an OFDMA symbol to a leading end of the OFDMA symbol.

RF unit 20 includes an upconverter for up-converting a signal into a radio frequency band, a power amplifier circuit for amplifying the up-converted signal, a band-pass filter for passing only a signal component, in a desired band, of the amplified signal and then outputting the signal component to first antenna 10 and second antenna 11.

Receiving unit 12 includes an RF unit 15, a CP removing unit 16, an FFT unit 17 and a subcarrier placing unit 18.

RF unit 15 includes a band-pass filter for passing only a signal component, in a desired band, of a signal to be output from first antenna 10 and second antenna 11, a low noise amplifier circuit for amplifying an RF signal, a downconverter for down-converting an RF signal, and the like.

CP removing unit 16 removes a CP from a signal to be output from RF unit 15.

FFT unit 17 transforms a time domain signal to be output from CP removing unit 16 to a frequency domain signal by FFT to demodulate the signal into a plurality of subcarriers.

Subcarrier placing unit 18 extracts each subcarrier to be output from FFT unit 17, on the basis of, for example, PUSC.

MAC layer processing unit 14 includes a user data transmission managing unit 34, a coding unit 33, a modulating unit 32, a demodulating unit 25, a decoding unit 26, a user data reception managing unit 27 and a controller unit 35.

User data transmission managing unit 34 manages user data to be transmitted to radio terminal 3.

Coding unit 33 codes a downlink signal in accordance with a coding rate of an MCS (Modulation and Code Scheme) to be instructed by setting unit 45.

Modulating unit 32 modulates a downlink signal to be transmitted to radio terminal 3, in accordance with a modulation mode of an MCS to be instructed by setting unit 45.

Demodulating unit 25 demodulates an uplink signal from radio terminal 3.

Decoding unit 26 decodes a demodulated uplink signal.

User data reception managing unit 27 manages user data received from radio terminal 3.

Controller unit 35 includes a communication level managing unit 91, a communication quality managing unit 41, a radio resource managing unit 42, a transmission wait buffer 44, a setting unit 45 and a switchover notifying unit 43.

Communication level managing unit 91 manages a communication level of a current downlink signal.

FIG. 4 is a diagram for illustrating the communication level.

With reference to FIG. 4, the communication level is set on the basis of a DL-MIMO communication mode and an MCS.

For example, in a case where the communication level is "1", the DL-MIMO communication mode is "MATRIX-A", the MCS is "QPSK ½" and a transmission amount per slot is D1 bits. In a case where the communication level is "9", the DL-MIMO communication mode is "MATRIX-B", the MCS is "64QAM ½" and a transmission rate per slot is D9 bits. When the communication level is raised, the transmission rate (bit/slot) increases.

A case where the value of the communication level increases represents "the communication level is raised" in this description, and a case where the value of the communication level decreases represents "the communication level is lowered" in this description. With regard to a single DL-MIMO communication mode, moreover, a case where the MCS is changed to have a high data rate represents "the level of the MCS is raised" in this description, and a case where the MCS is changed to have a low data rate represents "the level of the MCS is lowered" in this description.

Communication quality managing unit 41 receives, from each radio terminal 3, a notification about a carrier to interference and noise ratio (CINR) and a packet error rate (PER) of a measured downlink signal, and stores the notified carrier to interference and noise ratio (CINR) and packet error rate (PER).

Radio resource managing unit 42 manages a usage condition of a radio resource being in radio communication with one or more radio terminals. Specifically, radio resource managing unit 42 manages which radio terminal uses a downlink user data domain of an OFDMA frame, and also manages whether or not there is an available empty slot. Moreover, radio resource managing unit 42 manages which communication level is set for communication with regard to a used downlink user data domain.

Transmission wait buffer 44 stores user data received from communication control apparatus 4 via network 5 and to be transmitted to one or more radio terminals. The user data in transmission wait buffer 44 is deleted upon reception of ACK from a transmitting-side radio terminal.

Setting unit 45 switches a setting of a DL-MIMO communication mode with different one or more counterpart radio terminals from MATRIX-A to MATRIX-B, on the basis of the capability of the communication system having radio base station 2 and the one or more counterpart radio terminals.

Specifically, in a case where there is no available empty slot in the downlink user data domain of the OFDMA frame, setting unit 45 calculates an amount of user data received per unit time by radio base station 2 from communication control apparatus 4 via network 5, stored in transmission wait buffer 44 and to be transmitted to the one or more radio terminals, as an amount of data which must be transmitted per unit time. For example, setting unit 45 calculates D/10 (bit/second) obtained by dividing a count D of bits in user data received in the past ten seconds by ten seconds, as the amount of data which must be transmitted per unit time.

Moreover, in the case where there is no available empty slot in the downlink user data domain of the OFDMA frame, setting unit 45 calculates a total amount of data which can be transmitted per unit time, from the slot in the OFDMA frame. For example, in a case where radio terminal A establishes communication in which a count of slots is SA and a communication level is "1" and radio terminal B establishes communication in which a count of slots is SB and a communication level is "3", setting unit 45 calculates the total amount of data which can be transmitted per unit time in accordance with an expression (D1×SA+D3×SB)×f(bit/second) in which f represents a count of OFDMA frames in one second.

In a case where there is no available empty slot in the downlink user data domain of the OFDMA frame and the amount of data which must be transmitted per unit time exceeds the total amount of data which can be transmitted per unit time using the slots in the OFDMA frame, setting unit 45 switches, to MATRIX-B, the DL-MIMO communication mode of at least one radio terminal, in which a CINR is equal to or more than a predetermined value, out of the different one or more radio terminals in which the DL-MIMO communication mode is MATRIX-A.

Setting unit 45 performs the switchover of the MCS in the same MIMO communication mode, on the basis of a packet error rate (PER) from communication quality managing unit 41. Specifically, setting unit 45 raises the MCS in a case where the packet error rate (PER) is equal to or less than 1%, and lowers the MCS in a case where the packet error rate (PER) is equal to or more than 5%.

Switchover notifying unit 43 outputs a signal of a notification about the DL-MIMO communication mode and the MCS of the downlink signal to the radio terminal having the communication level switched by setting unit 45.

(Operation)

Figure 5:
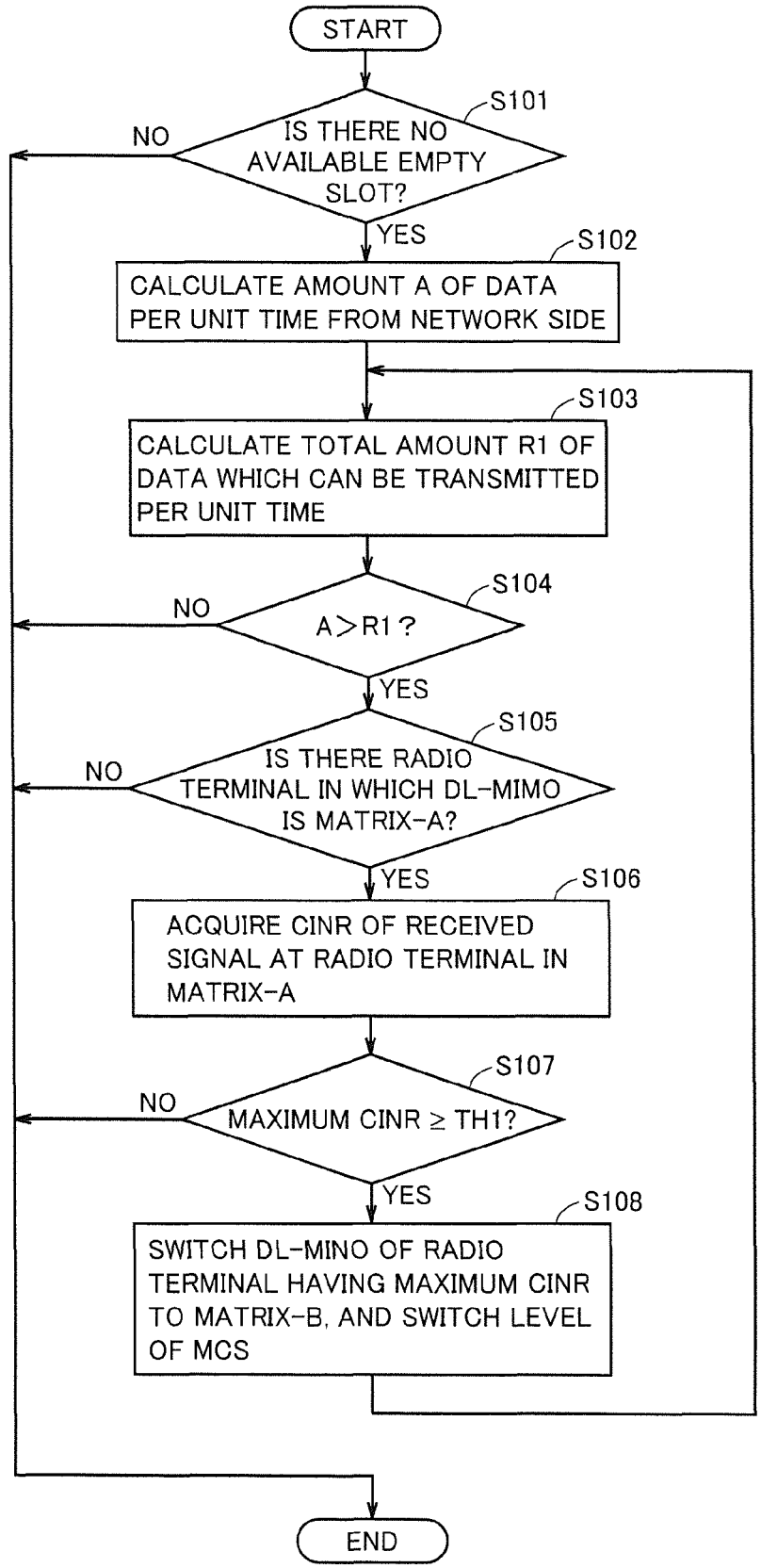
FIG. 5 is a flowchart showing a procedure of a DL-MIMO communication mode switching operation to be performed by the radio base station according to the first embodiment of the present invention.

FIG. 5 is a flowchart showing a procedure of a DL-MIMO communication mode switching operation to be performed by the radio base station according to the first embodiment.

With reference to FIG. 5, setting unit 45 acquires, from radio resource managing unit 42, information about the presence/absence of an available empty slot in a downlink user data domain of a frame (step S101).

Next, in a case where there is no available empty slot (YES in step S101), setting unit 45 calculates an amount A1 of user data received per unit time from communication control apparatus 4 via network 5 and stored in transmission wait buffer 44. Amount A1 of user data received per unit time indicates an amount of data which must be transmitted per unit time (step S102).

Next, setting unit 45 calculates an amount of data which can be transmitted per unit time, from a count of allocated slots and a transmission rate set by a DL-MIMO communication mode and a modulation mode, with regard to each radio terminal being in communication. Setting unit 45 calculates a sum of amounts of data which can be transmitted per unit time with regard to the respective radio terminals, as a total amount R1 of data which can be transmitted per unit time (step S103).

In a case where amount A of user data received per unit time is larger than total amount R1 of data which can be transmitted per unit time (YES in step S104), setting unit 45 determines whether or not there is a radio terminal in which a DL-MIMO communication mode is MATRIX-A.

In a case where there is a radio terminal in which a DL-MIMO communication mode is MATRIX-A (YES in step S105), further, setting unit 45 acquires, from communication quality managing unit 41, a CINR of the radio terminal in which the DL-MIMO communication mode is MATRIX-A (step S106).

In a case where the maximum value of the acquired CINR is equal to or more than a threshold value TH1 (YES in step S107), setting unit 45 switches the DL-MIMO communication mode of the radio terminal having the maximum CINR to MATRIX-B, and also switches the level of the MCS (step S108). Next, the program returns to step S103. In step S103, setting unit 45 calculates again total amount R1 of data which can be transmitted per unit time. The reason therefor is as follows. That is, total amount R1 of data varies because the transmission rate to the radio terminal switched to MATRIX-B varies.

As described above, according to the first embodiment, in the case where there is no available empty slot and the amount of data which must be transmitted per unit time exceeds the total amount of data which can be transmitted per unit time, it is possible to increase the total amount of data which can be transmitted per unit time by switching at least one radio terminal to MATRIX-B.

[Second Embodiment]

In a second embodiment, when a total value (indicating a reserved resource) of MRTRs about QoS (Quality of Service) exceeds, for example, of 70% of all radio resources, a DL-MIMO communication mode of at least one radio terminal is switched to MATRIX-B.

(Configuration)

Figure 6:
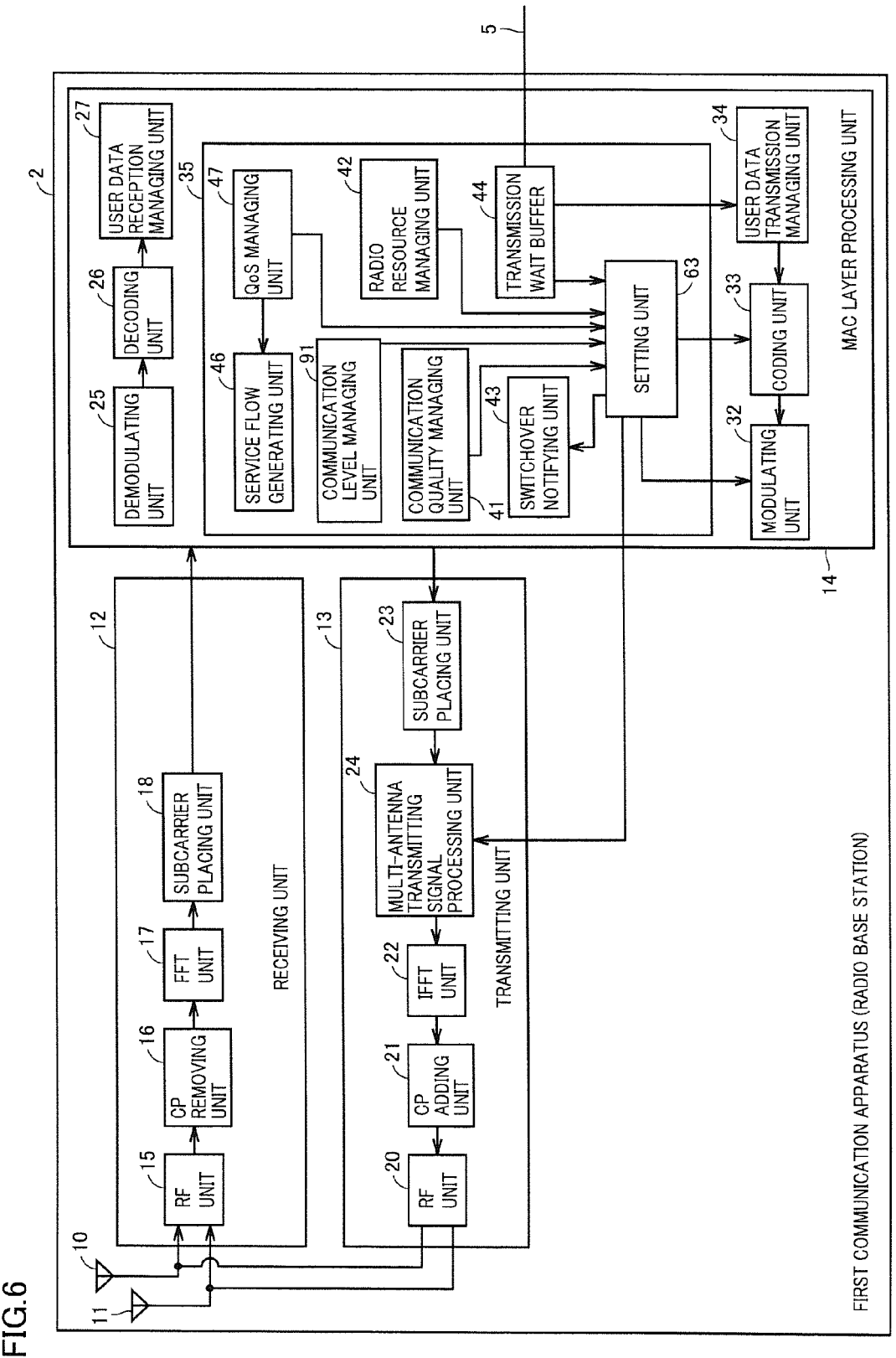
FIG. 6 is a diagram showing a configuration of a radio base station according to a second embodiment of the present invention.

FIG. 6 is a diagram showing a configuration of a radio base station according to the second embodiment of the present invention.

With reference to FIG. 6, the radio base station according to the second embodiment is different from the radio base station according to the first embodiment in the following points.

A QoS managing unit 47 manages the QoS of a service flow with one or more counterpart radio terminals. Specifically, QoS managing unit 47 manages, as the QoS, an MRTR (Minimum Reserved Traffic Rate), that is, a minimum reserved traffic rate per unit time.

A setting unit 63 and a service flow generating unit 46 calculate an amount of data which can be transmitted per unit time with regard to each counterpart radio terminal, from a slots count obtained by dividing a total count of slots in a downlink user data domain of a frame by a count of the counterpart radio terminals, and sum the amounts of data which can be transmitted per unit time, the amounts being calculated with regard to all the counterpart radio terminals, to calculate a total amount of data which can be transmitted per unit time.

For example, in a case of communicating with radio terminal A with a communication level set to "1" and communicating with radio terminal B with a communication level set to "3", setting unit 63 calculates a total amount of data which can be transmitted per unit time in accordance with an expression (D1×ASL/2+D3×ASL/2)×f(frame/second) in which f represents a count of OFDMA frames in one second and ASL represents a total count of slots in a downlink user data domain. Herein, the total amount of data which can be transmitted per unit time is calculated from the count of slots divided and allocated evenly to radio terminal A and radio terminal B out of the total count of slots rather than the count of slots allocated currently to radio terminal A and radio terminal B.

In a case where a sum of MRTRs of service flows established currently does not exceed the total amount of data which can be transmitted per unit time, service flow generating unit 46 generates a new service flow.

In a case where a ratio of the sum of MRTRs of service flows established currently to the total amount of data which can be transmitted per unit time exceeds a predetermined threshold value, setting unit 63 switches, to MATRIX-B, the DL-MIMO communication mode of at least one radio terminal, in which a CINR is equal to or more than a predetermined value, out of the one or more radio terminals in which the DL-MIMO communication mode is MATRIX-A.

(Operation)

Figure 7:
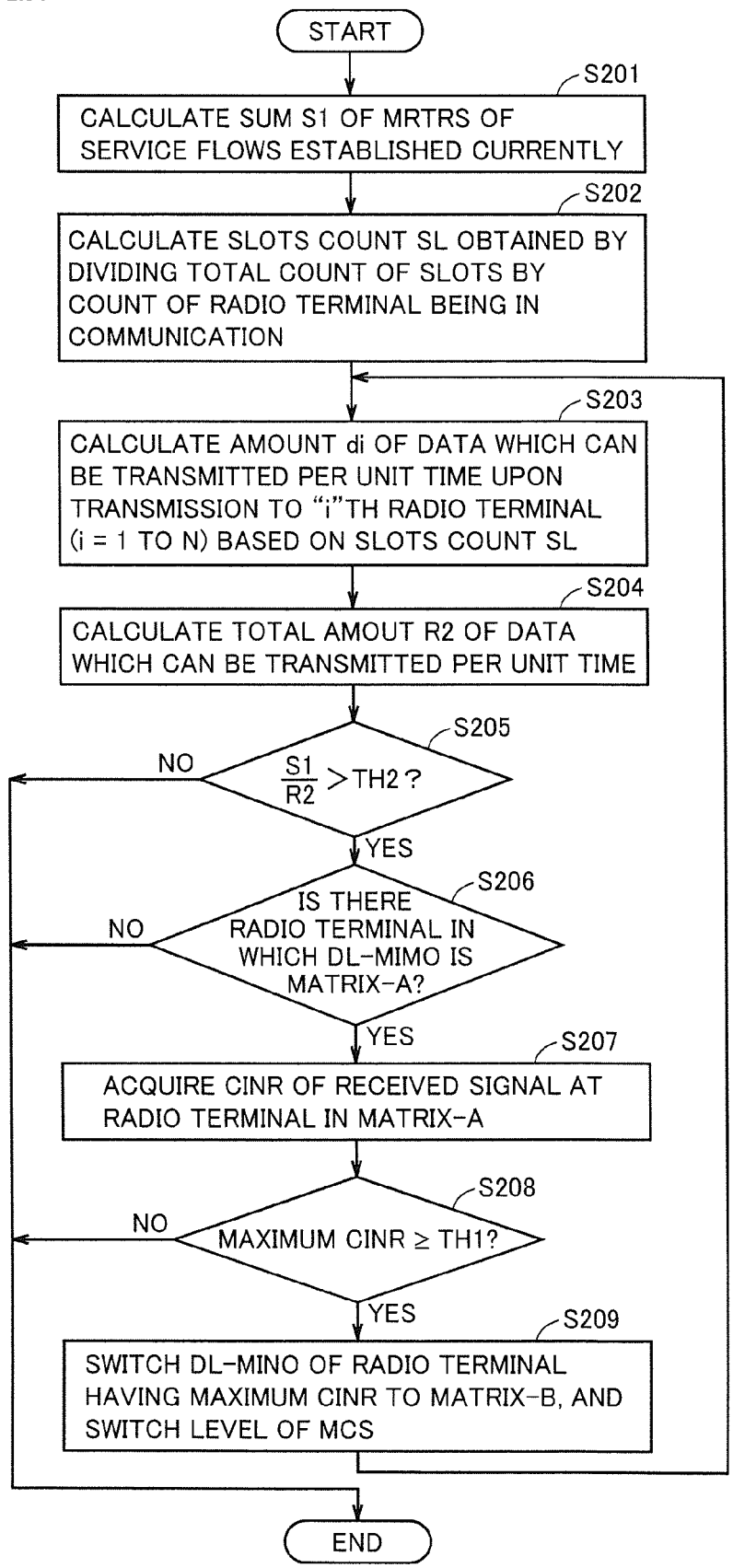
FIG. 7 is a flowchart showing a procedure of a DL-MIMO communication mode switching operation to be performed by the radio base station according to the second embodiment of the present invention.

FIG. 7 is a flowchart showing a procedure of a DL-MIMO communication mode switching operation to be performed by the radio base station according to the second embodiment of the present invention.

With reference to FIG. 7, setting unit 63 acquires, from QoS managing unit 47, MRTRs of one or more service flows established currently, and calculates a sum S1 of MRTRs of the one or more service flows (step S201).

Next, setting unit 63 calculates a slots count SL obtained by dividing a total count ASL of slots in a downlink user data domain of a frame by a count N of radio terminals being in communication (step S202).

Next, with regard to the "i"th radio terminal (i=1 to N, N: the total count of radio terminals being in communication), setting unit 63 calculates an amount di of data which can be transmitted per unit time on the basis of slots count SL, from slots count SL, a transmission rate set by the DL-MIMO communication mode and the modulation mode, and a count of frames per unit time (step S203).

Setting unit 63 calculates, as a total amount R2 of data which can be transmitted per unit time, a sum of amounts di of data which can be transmitted per unit time with regard to the respective radio terminals (step S204).

In a case where a ratio of a sum S1 of MRTRs to total amount R2 of data which can be transmitted per unit time is larger than a threshold value TH2 (e.g., 70%) (YES in step S205), setting unit 63 determines whether or not there is a radio terminal in which the DL-MIMO communication mode is MATRIX-A.

In a case where there is the radio terminal in which the DL-MIMO communication mode is MATRIX-A (YES in step S206), further, setting unit 63 acquires, from communication quality managing unit 41, a CINR of the radio terminal in which the DL-MIMO communication mode is MATRIX-A (step S207).

In a case where the maximum value of the acquired CINR is equal to or more than a threshold value TH1 (YES in step S208), setting unit 63 switches, to MATRIX-B, the DL-MIMO communication mode of the radio terminal having the maximum CINR, and then sets a level of an MCS (step S209). Further, the program returns to step 5203. In step 5203, setting unit 63 calculates again total amount R2 of data which can be transmitted per unit time. The reason therefor is as follows. That is, a total amount R1 of data varies because a transmission rate to the radio terminal switched to MATRIX-B varies.

As described above, according to the second embodiment, in the case where the ratio of the sum of MRTRs of service flows established currently to the total amount of data which can be transmitted per unit time exceeds the predetermined threshold value, it is possible to increase the total amount of data which can be transmitted per unit time by switching at least one radio terminal to MATRIX-B. As the result, it is possible to allow for the count of radio resources and, even in a case where there is a new radio terminal requesting communication, to add the radio terminal as a counterpart.

[Third Embodiment]

In a third embodiment, a DL-MIMO communication mode of a radio terminal, in which a total value of MRTRs (indicating reserved resources) exceeds an amount of data which can be transmitted per unit time, is switched to MATRIX-B.

(Configuration)

Figure 8:
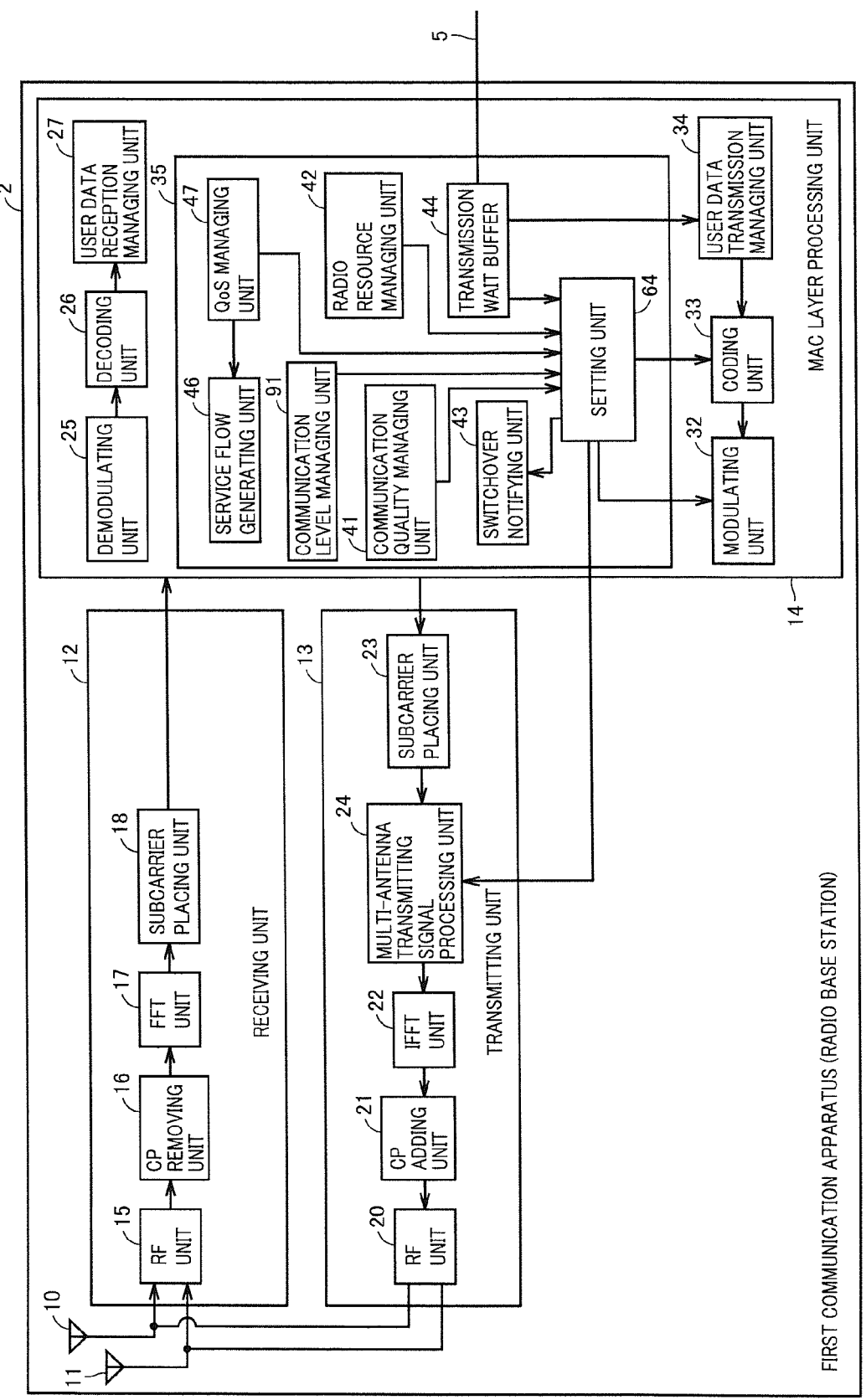
FIG. 8 is a diagram showing a configuration of a radio base station according to a third embodiment of the present invention.

FIG. 8 is a diagram showing a configuration of a radio base station according to the third embodiment of the present invention.

With reference to FIG. 8, the radio base station according to the third embodiment is different from the radio base station according to the first embodiment in the following points.

A QoS managing unit 47 manages QoS of service flows with one or more Counterpart radio terminals. Specifically, QoS managing unit 47 manages, as the QoS, an MRTR (Minimum Reserved Traffic Rate), that is, a minimum reserved traffic rate per unit time, and an MSTR (Maximum Sustained Traffic Rate).

In a case where a sum of MRTRs of service flows established currently does not exceed the total amount of data which can be transmitted per unit time, service flow generating unit 46 generates a new service flow.

A setting unit 64 calculates an amount of data which can be transmitted per unit time with regard to each radio terminal, from a slots count obtained by dividing a total count of slots in a downlink user data domain of a frame by a count of counterpart radio terminals.

In a case where there is a radio terminal which becomes a new counterpart, setting unit 64 determines whether or not there is a radio terminal in which a CINR is equal to or more than a predetermined value and a DL-MIMO communication mode is MATRIX-A. In a case where there is the radio terminal, when the following requirement (A) is satisfied, setting unit 64 switches the DL-MIMO communication mode of the radio terminal to MATRIX-B.

(A) A total value of MSTRs of service flows with the radio terminal is larger than an amount of data which can be transmitted per unit time with regard to the radio terminal.

(Operation)

Figure 9:
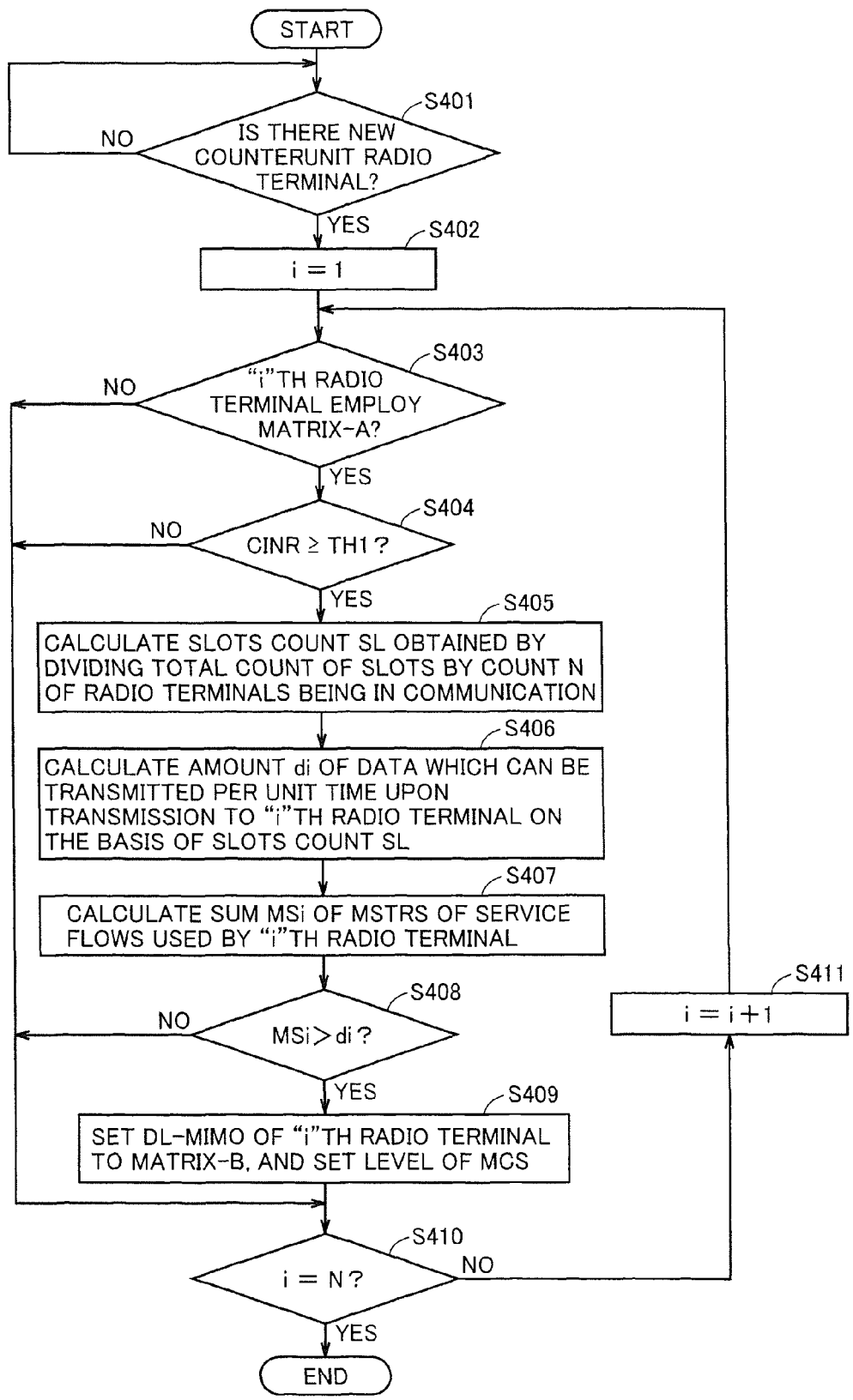
FIG. 9 is a flowchart showing a procedure of a DL-MIMO communication mode switching operation to be performed by the radio base station according to the third embodiment of the present invention.

FIG. 9 is a flowchart showing a procedure of a DL-MIMO communication mode switching operation to be performed by the radio base station according to the third embodiment of the present invention.

With reference to FIG. 9, in a case where there is a radio terminal which becomes a new counterpart (YES in step S401), setting unit 64 makes a setting of i=1 (step S402), and makes a determination about switchover of the DL-MIMO communication mode of the "i"th radio terminal.

In a case where the DL-MIMO communication mode of the "i"th radio terminal is MATRIX-A (YES in step S403), setting unit 64 acquires, from communication quality managing unit 41, a CINR of the "i"th radio terminal.

In a case where the CINR of the "i"th radio terminal is equal to or more than a threshold value TH1 (YES in step S404), setting unit 64 calculates a slots count SL obtained by dividing a total count of slots in a downlink user data domain of a frame by a count N of radio terminals being in communication (step S405).

Next, with regard to the "i"th radio terminal, the setting unit calculates an amount di of data which can be transmitted per unit time on the basis of slots count SL, from slots count SL and a transmission rate set by the DL-MIMO communication mode and the modulation mode (step S406).

Setting unit 64 acquires, from QoS managing unit 47, MSTRs of one or more service flows established currently with the "i"th radio terminal, and calculates a total value MSi of the MSTRs of the one or more service flows (step S407).

In a case where total value MSi of the MSTRs is larger than amount di of data which can be transmitted per unit time (YES in step S408), setting unit 64 switches the DL-MIMO communication mode of the "i"th radio terminal to MATRIX-B, and sets a level of an MCS (step S409).

When "i" is not equal to count N of counterpart radio terminals (NO in step S410), setting unit 64 increments "i" by 1 (step S411), and then the program returns to step S403.

As described above, according to the third embodiment, with regard to each counterpart radio terminal, in the case where the DL-MIMO communication mode is MATRIX-A and the amount of data which can be transmitted is smaller than the amount of data which are allowed to be transmitted, the DL-MIMO communication mode of the radio terminal is switched to MATRIX-B. Thus, it is possible to increase the amount of data which can be transmitted, and to prevent data from being abandoned.

[Fourth Embodiment]

In a fourth embodiment, a DL-MIMO communication mode of a radio terminal, in which a total value of MRTRs (indicating reserved resources) exceeds an amount of data which can be subjected to transmission processing per unit time, is switched to MATRIX-B.

(Configuration)

Figure 10:
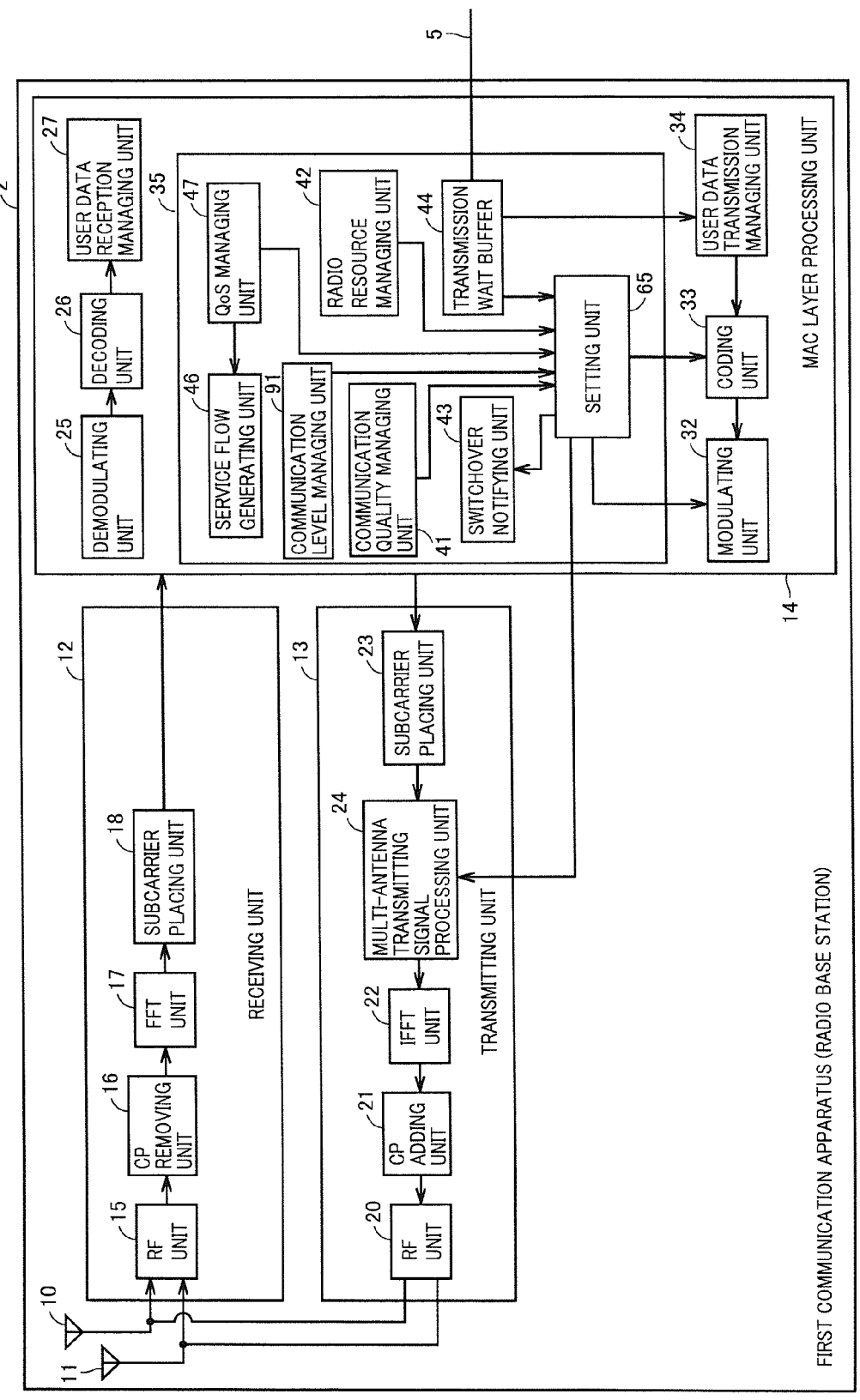
FIG. 10 is a diagram showing a configuration of a radio base station according to a fourth embodiment of the present invention.

FIG. 10 is a diagram showing a configuration of a radio base station according to the fourth embodiment of the present invention.

With reference to FIG. 10, the radio base station according to the fourth embodiment is different from the radio base station according to the first embodiment in the following points.

A QoS managing unit 47 manages QoS of service flows with one or more counterpart radio terminals. Specifically, QoS managing unit 47 manages, as the QoS, an MRTR (Minimum Reserved Traffic Rate), that is, a minimum reserved traffic rate per unit time, and an MSTR (Minimum Sustained Traffic Rate).

In a case where a sum of MRTRs of service flows established currently does not exceed a total amount of data which can be transmitted per unit time, service flow generating unit 46 generates a new service flow.

A setting unit 65 calculates an amount of data which can be transmitted per unit time with regard to each radio terminal, from a slots count obtained by dividing a total count of slots in a downlink user data domain of a frame by a count of counterpart radio terminals.

In a case where there is a radio terminal which becomes a new counterpart, setting unit 65 determines whether or not there is a radio terminal in which a CINR is equal to or more than a predetermined value and a DL-MIMO communication mode is MATRIX-A. In a case where there is the radio terminal, when the following requirement (B) is satisfied, setting unit 65 switches the DL-MIMO communication mode of the radio terminal to MATRIX-B.

(B) A total value of MSTRs of service flows with the radio terminal is larger than an amount of data which can be subjected to transmission processing by a CPU of the radio terminal per unit time.

(Operation)

Figure 11:
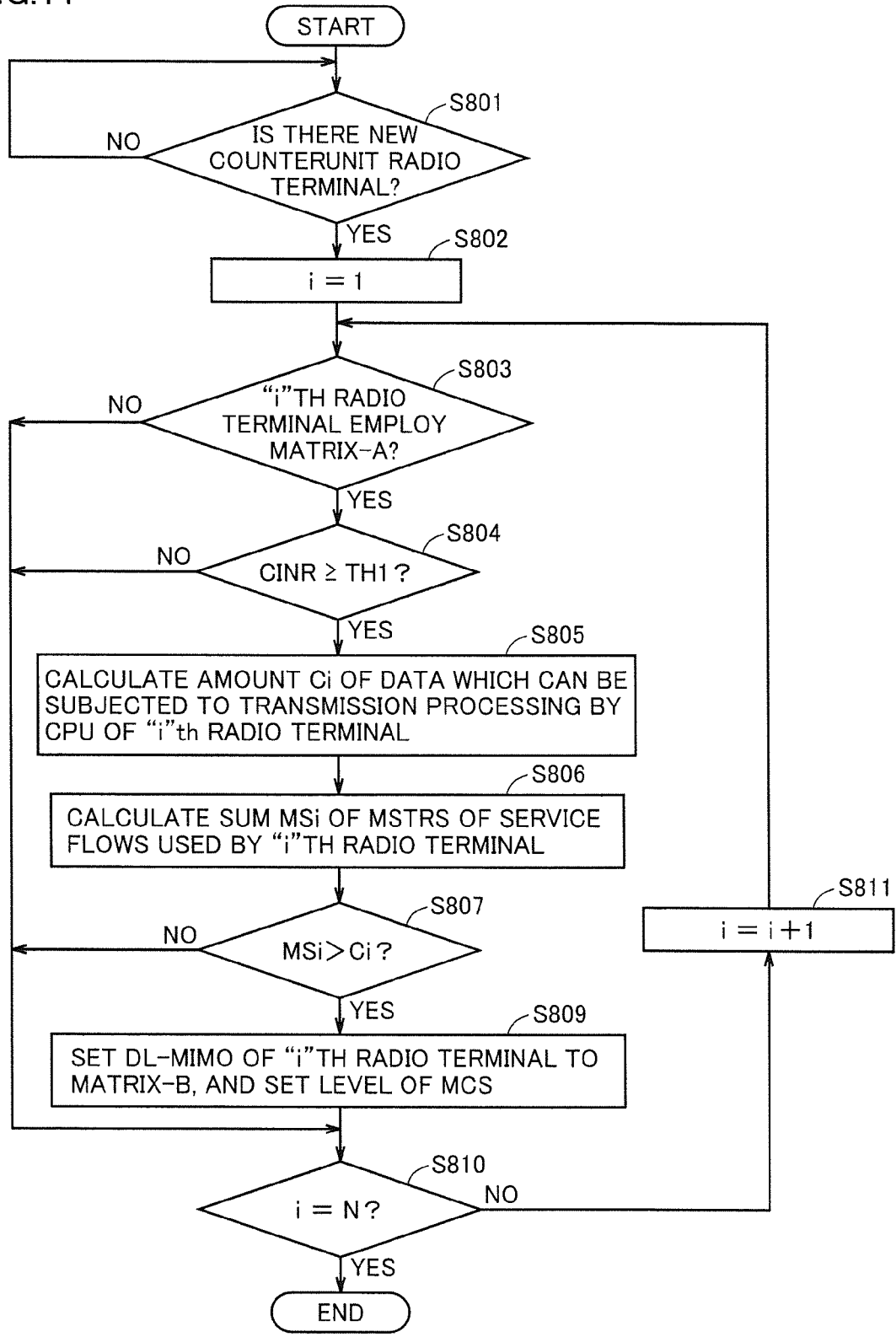
FIG. 11 is a flowchart showing a procedure of a DL-MIMO communication mode switching operation to be performed by the radio base station according to the fourth embodiment of the present invention.

FIG. 11 is a flowchart showing a procedure of a DL-MIMO communication mode switching operation to be performed by the radio base station according to the fourth embodiment of the present invention.

With reference to FIG. 11, in a case where there is a radio terminal which becomes a new counterpart (YES in step S801), setting unit 65 makes a setting of i=1 (step S802), and makes a determination about switchover of a DL-MIMO communication mode of the "i"th radio terminal.

In a case where the DL-MIMO communication mode of the "i"th radio terminal is MATRIX-A (YES in step S803), setting unit 65 acquires, from communication quality managing unit 41, a CINR of the "i"th radio terminal.

In a case where the CINR of the "i"th radio terminal is equal to or more than a threshold value TH1 (YES in step S804), setting unit 65 calculates an amount Ci of data which can be subjected to transmission processing by the CPU of the "i"th radio terminal (step S805).

Next, setting unit 65 acquires, from QoS managing unit 47, MSTRs of one or more service flows established currently with the "i"th radio terminal, and calculates a total value MSi of the MSTRs of the one or more service flows (step S806).

In a case where total value MSi of the MSTRs is larger than an amount Ci of data which can be subjected to transmission processing per unit time (YES in step S807), setting unit 65 switches the DL-MIMO communication mode of the "i"th radio terminal to MATRIX-B, and sets a level of an MCS (step S809).

When "i" is not equal to a count N of counterpart radio terminals (NO in step S810), setting unit 65 increments "i" by 1 (step S811), and then the program returns to step S803.

As described above, according to the fourth embodiment, with regard to each counterpart radio terminal, in the case where the DL-MIMO communication mode is MATRIX-A and the amount of data which can be subjected to the transmission processing is smaller than the amount of data which are allowed to be transmitted, the DL-MIMO communication mode of the radio terminal is switched to MATRIX-B. Thus, it is possible to increase the amount of data which can be subjected to the transmission processing, and to prevent data from being abandoned.

[Fifth Embodiment]

In a fifth embodiment, a limitation on a tolerated latency based on QoS is lifted. Therefore, a DL-MIMO communication mode of a radio terminal predicted that data is abandoned is switched to MATRIX-B.

(Configuration)

Figure 12:
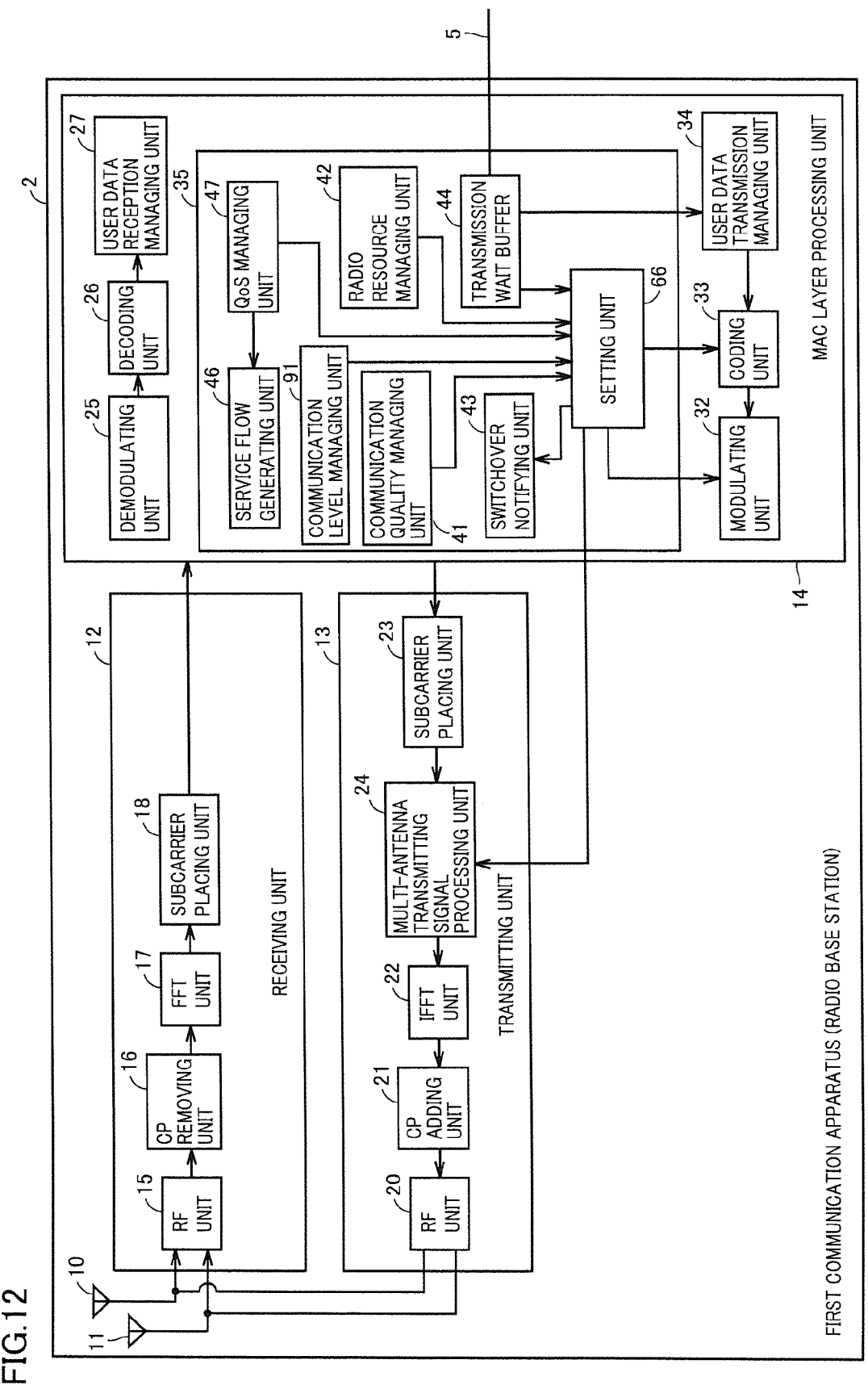
FIG. 12 is a diagram showing a configuration of a radio base station according to a fifth embodiment of the present invention.

FIG. 12 is a diagram showing a configuration of a radio base station according to the fifth embodiment of the present invention.

With reference to FIG. 12, the radio base station according to the fifth embodiment is different from the radio base station according to the first embodiment in the following points.

A QoS managing unit 47 manages QoS of service flows with one or more counterpart radio terminals. Specifically, QoS managing unit 47 manages a tolerated latency as QoS.

In a case where a sum of MRTRs of service flows established currently does not exceed a total amount of data which can be transmitted per unit time, service flow generating unit 46 generates a new service flow.

A setting unit 66 calculates an amount of data which can be transmitted per frame with regard to each radio terminal, from a slots count obtained by dividing a total count of slots in a downlink user data domain of a frame by a count of counterpart radio terminals.

With regard to a radio terminal in which a CINR is equal to or more than a predetermined value and a DL-MIMO communication mode is MATRIX-A, when the following requirement (C) is satisfied, setting unit 66 switches the DL-MIMO communication mode of the radio terminal to MATRIX-B.

(C) An amount of data which must be transmitted in any of "α" consecutive frames in which a current frame is the leading one exceeds an amount of data which can be transmitted in one frame, by α times, because of a limitation on a tolerated latency based on QoS.

(Operation)

Figure 13:
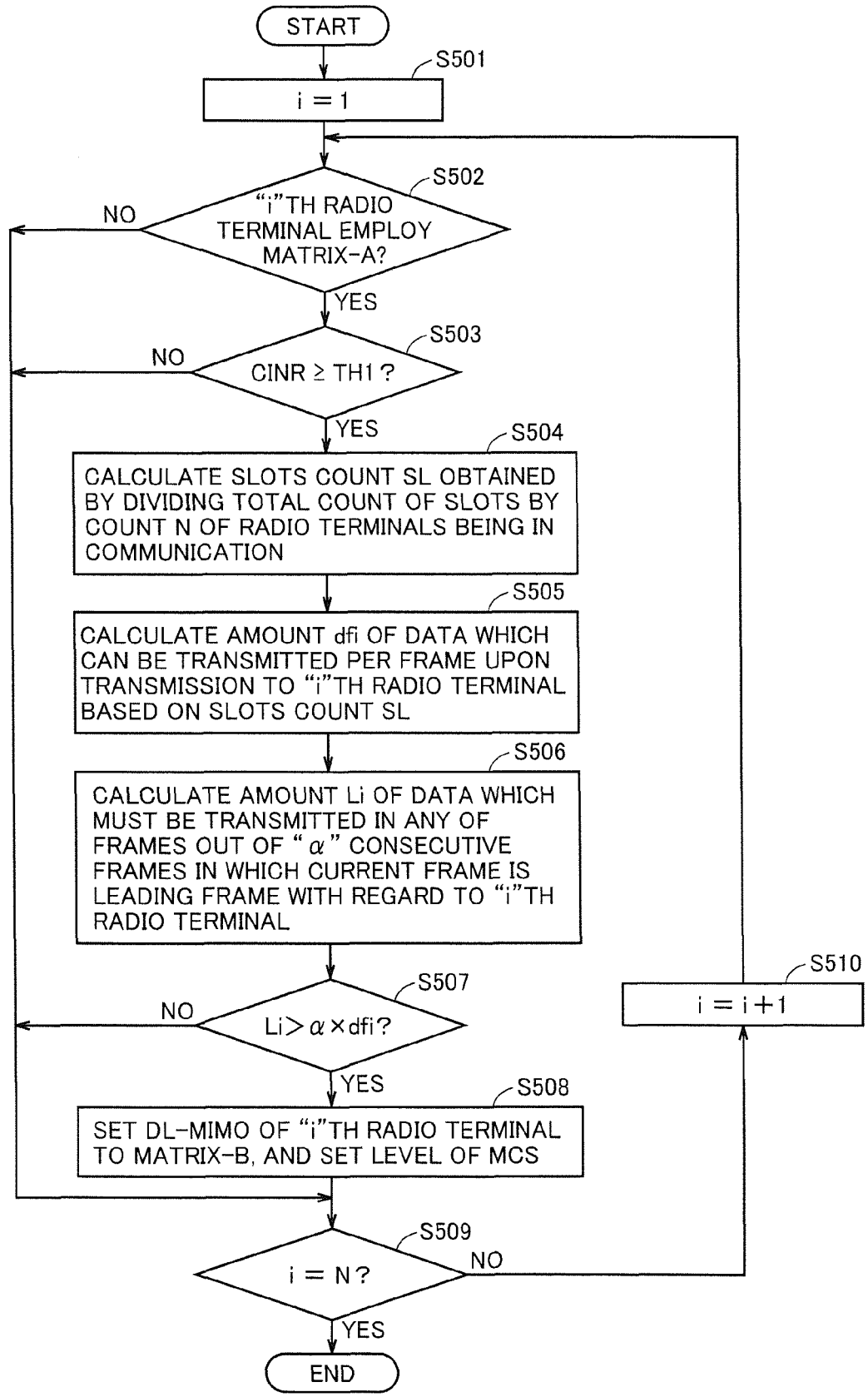
FIG. 13 is a flowchart showing a procedure of a DL-MIMO communication mode switching operation to be performed by the radio base station according to the fifth embodiment of the present invention.

FIG. 13 is a flowchart showing a procedure of a DL-MIMO communication mode switching operation to be performed by the radio base station according to the fifth embodiment of the present invention.

With reference to FIG. 13, setting unit 66 makes a setting of i=1 (step S501), and makes a determination about switchover of a DL-MIMO communication mode of the "i"th radio terminal.

In a case where the DL-MIMO communication mode of the "i"th radio terminal is MATRIX-A (YES in step S502), setting unit 66 acquires from, communication quality managing unit 41, a CINR of the "i"th radio terminal.

In a case where the CINR of the "i"th radio terminal is equal to or more than a threshold value TH1 (YES in step S503), setting unit 66 calculates a slots count SL obtained by dividing a total count of slots in a downlink user data domain of a frame by a count N of radio terminals being in communication (step S504).

Next, with regard to the "i"th radio terminal, the setting unit calculates an amount dfi of data which can be transmitted per frame on the basis of slots count SL, from slots count SL and a transmission rate set by the DL-MIMO communication mode and the modulation mode (step S505).

With regard to the "i"th radio terminal, in a case where "α" consecutive frames in which a current frame is the leading one, that is, the current frame is a "K"th frame, setting unit 66 calculates an amount Li of data which must be transmitted in any of "K"th to "(K+α−1)"th frames (step S506).

In a case where amount Li of data which must be transmitted in any of the "α" consecutive frames is larger than an amount dfi of data which can be transmitted per frame by α times (YES in step S507), setting unit 66 switches the DL-MIMO communication mode of the "i"th radio terminal to MATRIX-B, and sets a level of an MCS (step S508).

When "i" is not equal to count N of counterpart radio terminals (NO in step S509), setting unit 66 increments "i" by 1 (step S510), and then the program returns to step S502.

As described above, according to the fifth embodiment, with regard to each counterpart radio terminal, in the case where the DL-MIMO communication mode is MATRIX-A and the amount of data which must be transmitted in any of the "α" consecutive frames in which the current frame is the leading one exceeds the amount of data which can be transmitted in one frame by α times, the DL-MIMO communication mode is switched to MATRIX-B. Thus, it is possible to increase the amount of data which can be transmitted in one frame, and to prevent data from being abandoned.

[Sixth Embodiment]

In a sixth embodiment, a DL-MIMO communication mode of a radio terminal in which an amount of data received per unit time via a network 5 exceeds an amount of data which can be transmitted per unit time is switched to MATRIX-B.

(Configuration)

Figure 14:
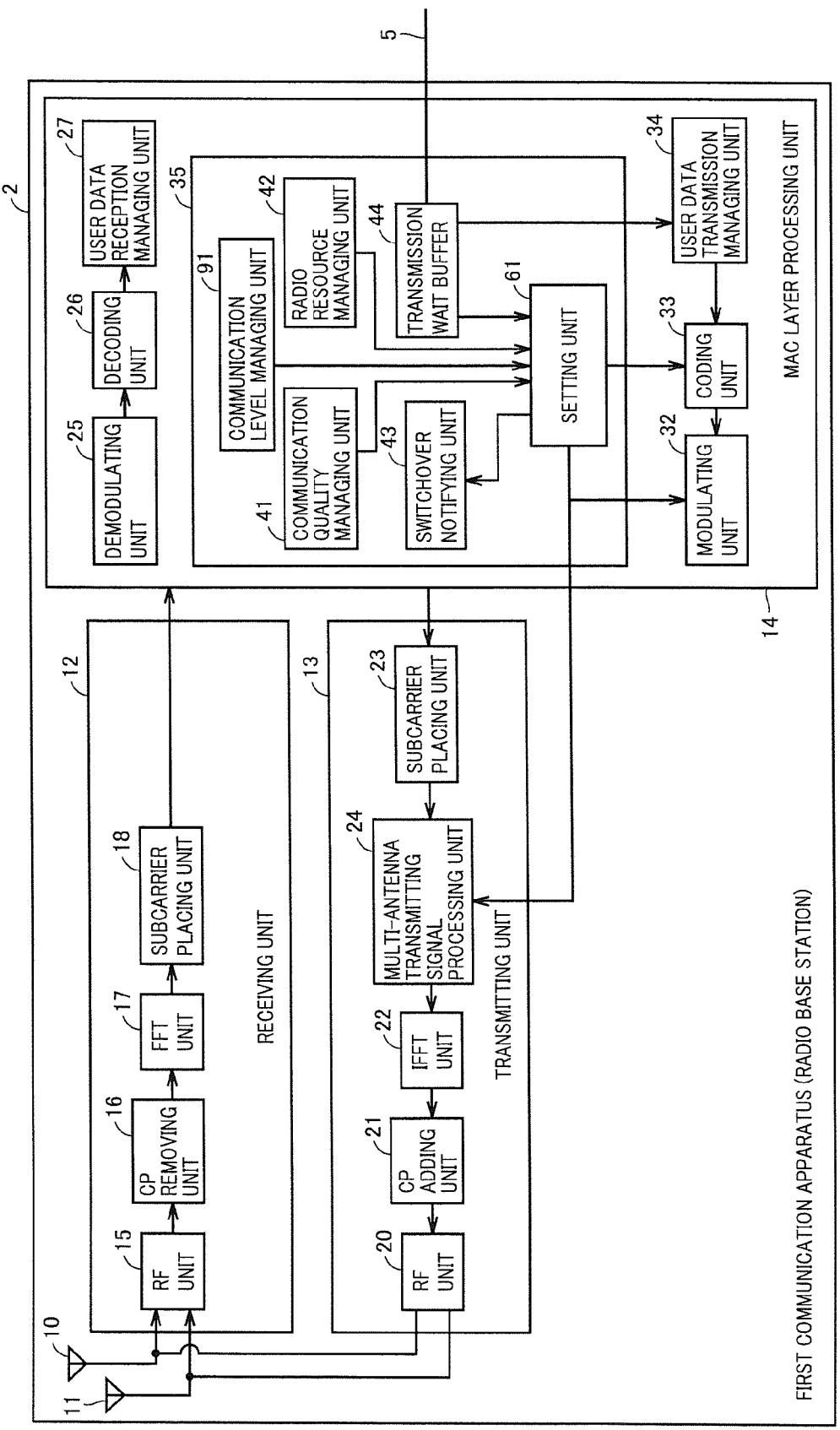
FIG. 14 is a diagram showing a configuration of a radio base station according to a sixth embodiment of the present invention.

FIG. 14 is a diagram showing a configuration of a radio base station according to the sixth embodiment of the present invention.

With reference to FIG. 14, the radio base station according to the sixth embodiment is different from the radio base station according to the first embodiment in the following points.

A setting unit 61 calculates, as an amount of data which must be transmitted per unit time, an amount of user data received per unit time by a radio base station 2 from a communication control apparatus 4 via network 5 and to be transmitted to each radio terminal.

Setting unit 61 calculates an amount of data which can be transmitted per unit time in each radio terminal, from a slots count obtained by dividing a total count of slots in a downlink user data domain of a frame by a count of counterpart radio terminals.

Setting unit 61 sets a domain having a size SZ, which is obtained by dividing a size of a transmission wait buffer 44 by the count of counterpart radio terminals, at a transmission wait buffer which can be utilized for each radio terminal, out of transmission wait buffers 44.

With regard to a radio terminal in which a CINR is equal to or more than a predetermined value and a DL-MIMO communication mode is MATRIX-A, when the following requirement (D) is satisfied, setting unit 61 switches the DL-MIMO communication mode of the radio terminal to MATRIX-B.

(D) Transmission wait buffer 44 which can be utilized for the radio terminal becomes full, and the amount of data which must be transmitted per unit time exceeds the amount of data which can be transmitted per unit time.

(Operation)

Figure 15:
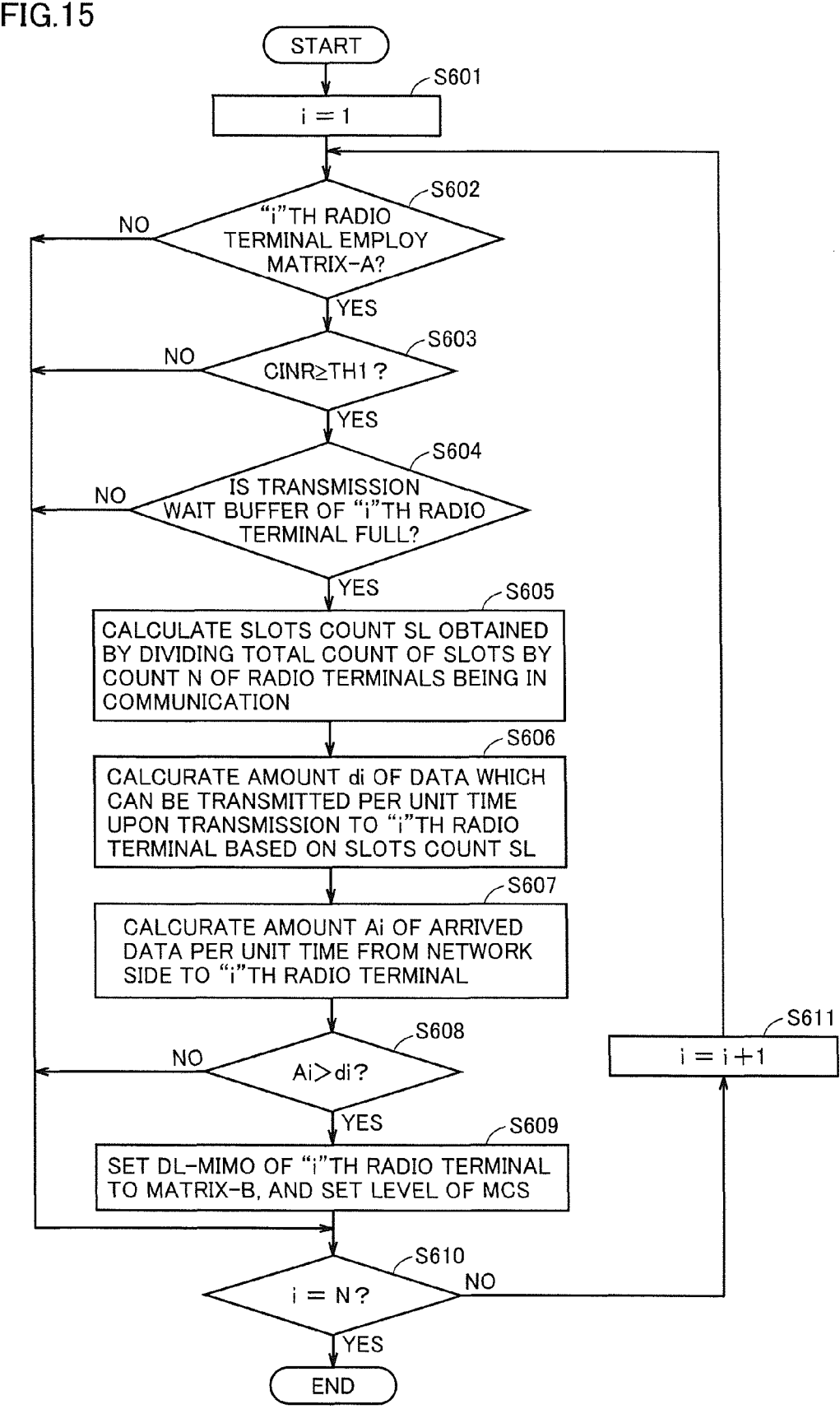
FIG. 15 is a flowchart showing a procedure of a DL-MIMO communication mode switching operation to be performed by the radio base station according to the sixth embodiment of the present invention.

FIG. 15 is a flowchart showing a procedure of a DL-MIMO communication mode switching operation to be performed by the radio base station according to the sixth embodiment of the present invention.

With reference to FIG. 15, setting unit 61 makes a setting of i=1 (step S601), and makes a determination about switchover of a DL-MIMO communication mode of the "i"th radio terminal.

In a case where the DL-MIMO communication mode of the "i"th radio terminal is MATRIX-A (YES in step S602), setting unit 61 acquires, from a communication quality managing unit 41, a CINR of the "i"th radio terminal.

In a case where the CINR of the "i"th radio terminal is equal to or more than a threshold value TH1 (YES in step 5603) and transmission wait buffer 44 which can be utilized for the "i"th radio terminal is full (YES in step S604), setting unit 61 calculates a slots count SL obtained by dividing a total count of slots in a downlink user data domain of a frame by a count N of radio terminals being in communication (step S605).

Next, with regard to the "i"th radio terminal, the setting unit calculates an amount di of data which can be transmitted per unit time on the basis of the slots count, from slots count SL and a transmission rate set by the DL-MIMO communication mode and the modulation mode (step S606).

Setting unit 61 calculates an amount Ai of user data of the "i"th radio terminal received per unit time from communication control apparatus 4 via network 5 and stored in transmission wait buffer 44. Amount Ai of user data of the "i"th radio terminal received per unit time indicates an amount of data which must be transmitted per unit time to the "i"th radio terminal (step S607).

In a case where amount Ai of user data received per unit time is larger than amount di of data which can be transmitted per unit time (YES in step S608), setting unit 61 switches the DL-MIMO communication mode of the "i"th radio terminal to MATRIX-B (step S609).

When "i" is not equal to count N of counterpart radio terminals (NO in step S610), setting unit 61 increments "i" by 1 (step S611), and then the program returns to step S602.

As described above, according to the sixth embodiment, with regard to each counterpart radio terminal, in the case where the transmission wait buffer which can be utilized for each radio terminal is full and the amount of data which must be transmitted per unit time exceeds the amount of data which can be transmitted per unit time, the DL-MIMO communication mode is switched to MATRIX-B. Thus, it is possible to increase the amount of data which can be transmitted per unit time, and to prevent data from being abandoned.

[Seventh Embodiment]

In a seventh embodiment, a DL-MIMO communication mode of a radio terminal, in which an amount of data which can be transmitted per frame is smaller than a size of a transmission wait buffer which can be used in one frame, is switched to MATRIX-B.

(Configuration)

Figure 16:
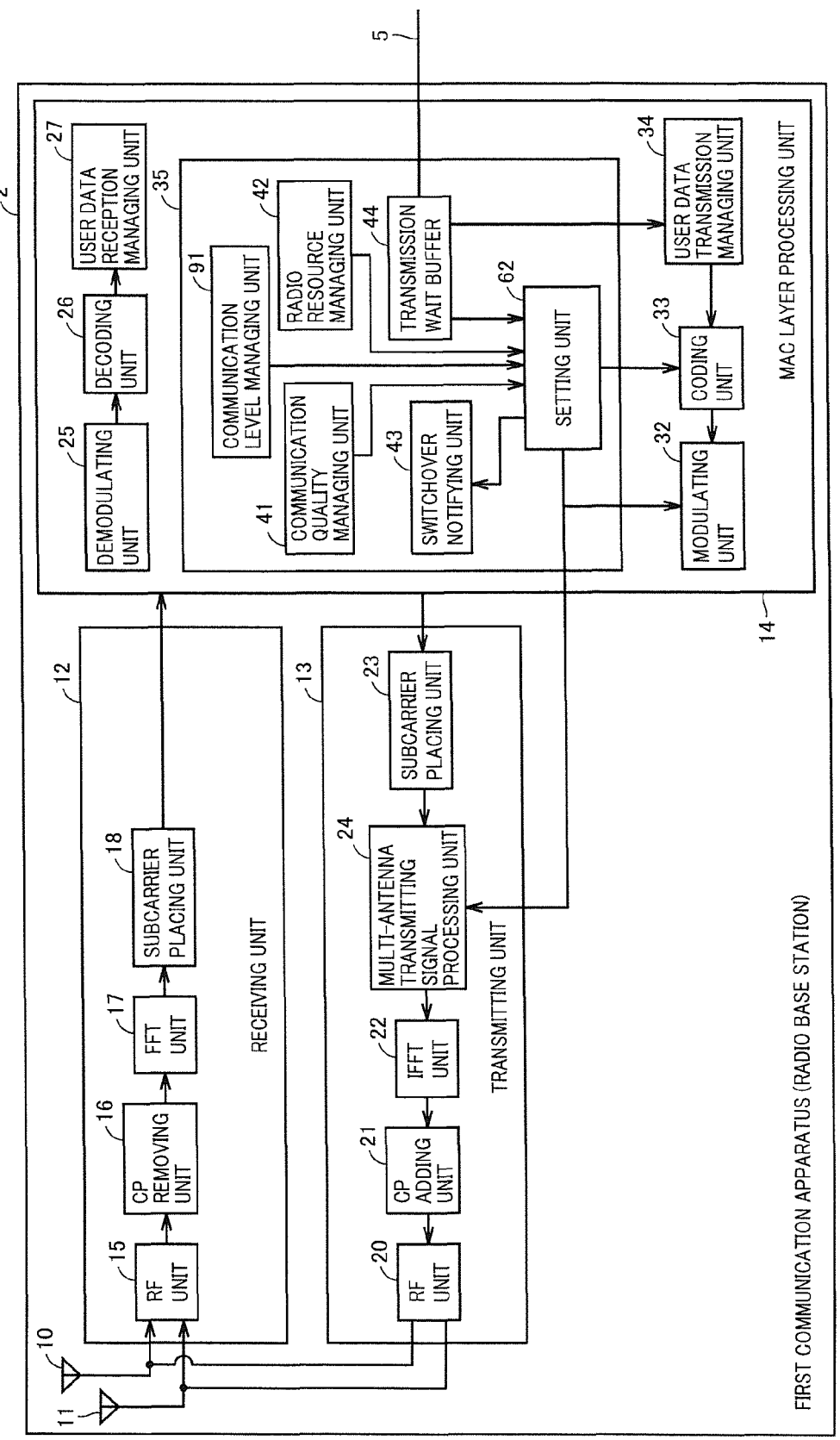
FIG. 16 is a diagram showing a configuration of a radio base station according to a seventh embodiment of the present invention.

FIG. 16 is a diagram showing a configuration of a radio base station according to the seventh embodiment of the present invention.

With reference to FIG. 16, the radio base station according to the seventh embodiment is different from the radio base station according to the first embodiment in the following points.

A setting unit 62 calculates an amount of data which can be transmitted in one frame with regard to each radio terminal, from a slots count obtained by dividing a total count of slots in a downlink user data domain of a frame by a count of counterpart radio terminals.

Setting unit 62 sets a domain having a size SZ, which is obtained by dividing a size of a transmission wait buffer 44 by a count of counterpart radio terminals, at a transmission wait buffer which can be utilized for each radio terminal, out of transmission wait buffers 44.

Setting unit 62 calculates a value obtained by dividing the size of transmission wait buffer 44 which can be utilized for each radio terminal by a count of frames at retransmission cycles specified by an HARQ (Hybrid Automatic Repeat Request), at a size which can be used per frame.

In a case where there is a radio terminal which becomes a new counterpart, setting unit 62 determines whether or not there is a radio terminal in which a CINR is equal to or more than a predetermined value and a DL-MIMO communication mode is MATRIX-A. In a case where there is the radio terminal, when the following requirement (E) is satisfied, setting unit 62 switches the DL-MIMO communication mode of the radio terminal to MATRIX-B.

(E) The amount of data which can be transmitted per frame is smaller than the size which can be used per frame, out of the sizes of transmission wait buffers 44 which can be utilized for the radio terminal.

(Operation)

Figure 17:
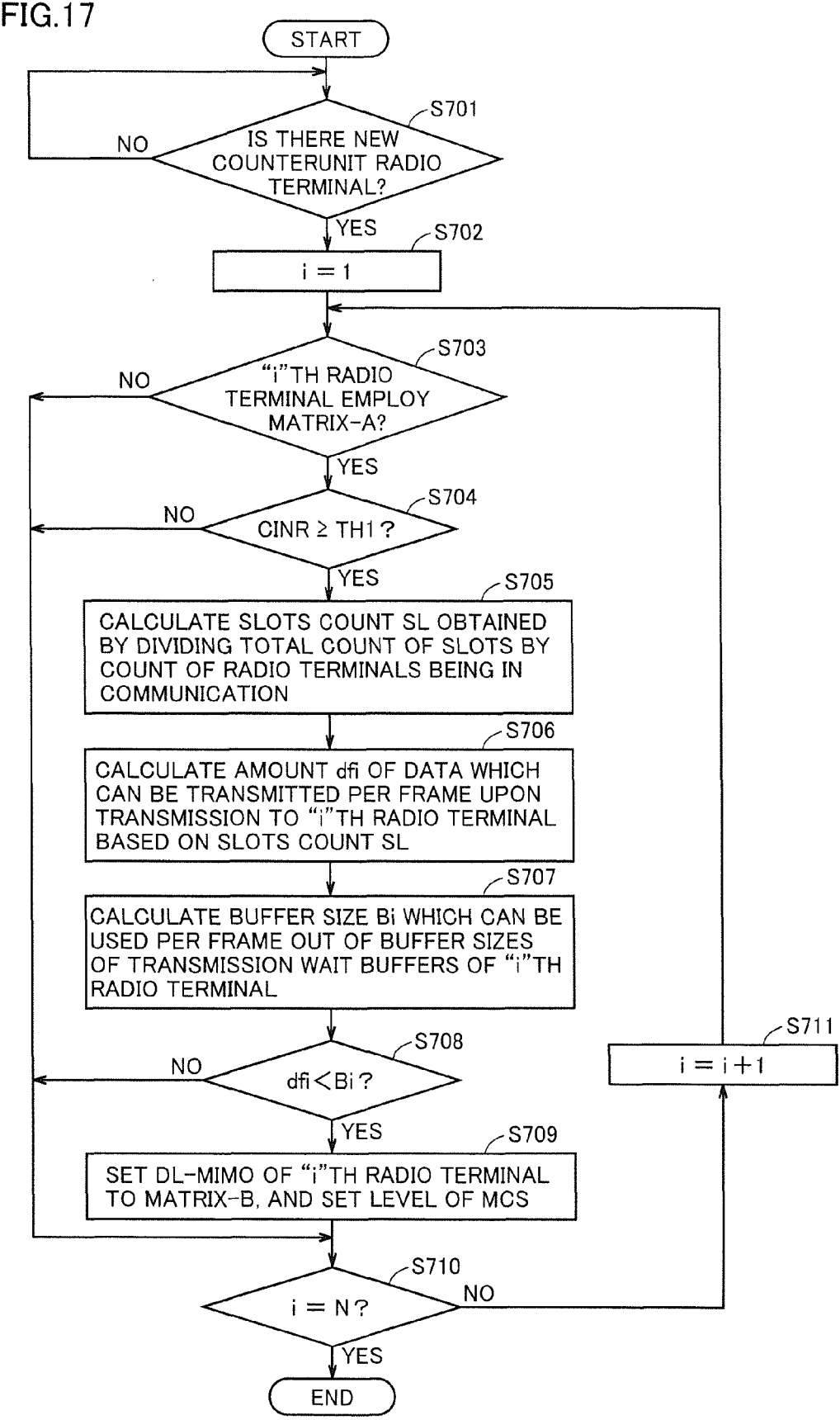
FIG. 17 is a flowchart showing a procedure of a DL-MIMO communication mode switching operation to be performed by the radio base station according to the seventh embodiment of the present invention.

FIG. 17 is a flowchart showing a procedure of a DL-MIMO communication mode switching operation to be performed by the radio base station according to the seventh embodiment of the present invention.

With reference to FIG. 17, in a case where there is a radio terminal which becomes a new counterpart (YES in step S701), setting unit 62 makes a setting of i=1 (step S702), and makes a determination about switchover of a DL-MIMO communication mode of the "i"th radio terminal.

In a case where the DL-MIMO communication mode of the "i"th radio terminal is MATRIX-A (YES in step S703), setting unit 62 acquires, from communication quality managing unit 41, a CINR of the "i"th radio terminal.

In a case where the CINR of the "i"th radio terminal is equal to or more than a threshold value TH1 (YES in step S704), setting unit 62 calculates a slots count SL obtained by dividing a total count of slots in a downlink user data domain of a frame by a count N of radio terminals being in communication (step S705).

Next, with regard to the "i"th radio terminal, the setting unit calculates an amount dfi of data which can be transmitted per frame on the basis of slots count SL, from slots count SL and a transmission rate set by the DL-MIMO communication mode and the modulation mode (step S706).

Setting unit 62 calculates a buffer size Bi which can be used per frame out of the buffer sizes of transmission wait buffers 44 for the "i"th radio terminal. Specifically, setting unit 62 calculates, as the size which can be used per frame, a value obtained by dividing the size of transmission wait buffer 44 which can be utilized for the "i"th radio terminal by a count of frames at retransmission cycles (step S707).

In a case where buffer size Bi which can be used per frame is larger than amount dfi of data which can be transmitted per frame (YES in step S708), setting unit 62 switches the DL-MIMO communication mode of the "i"th radio terminal to MATRIX-B, and sets a level of an MCS (step 709).

When "i" is not equal to count N of counterpart radio terminals (NO in step S710), setting unit 62 increments "i" by 1 (step S711), and then the program returns to step S703.

As described above, according to the seventh embodiment, with regard to each counterpart radio terminal, in the case where the amount of data which can be transmitted per frame is smaller than the size which can be used per frame out of the sizes of the transmission wait buffers which can be utilized for each radio terminal, the DL-MIMO communication mode is switched to MATRIX-B. Thus, it is possible to increase the amount of data which can be transmitted per frame, and to utilize the transmission buffers at the maximum.

(Modification Examples)

The present invention is not limited to the foregoing embodiments, but may involve the following modification examples.

(1) Switchover Table According to the First Embodiment

In the embodiments of the present invention, the setting unit performs the switchover of the MCS in the same MIMO communication mode, on the basis of the packet error rate (PER) from communication quality managing unit 41; however, the present invention is not limited thereto. For example, the setting unit may perform switchover to a communication level responsive to a carrier to interference and noise ratio (CINR) of a measured downlink signal.

(2) Non-Spatial Multiplexing Mode/Spatial Multiplexing Mode

In the embodiments of the present invention, the description is given of the switchover from the non-spatial multiplexing mode (DL MIMO MATRIX-A) to the spatial multiplexing mode (DL MIMO MATRIX-B) in the communication system for WiMAX; however, the present invention is not limited thereto. The present invention may also be applicable to switchover from a non-spatial multiplexing mode to a spatial multiplexing mode in a different communication system.

(3) Communication Quality of Downlink Signal

In the embodiments of the present invention, the communication quality (PER, CINR) of the downlink signal is transmitted from the radio terminal to the radio base station in the uplink frame; however, the present invention is not limited thereto. For example, the communication quality of the downlink signal may be calculated on the basis of an NACK (Negative ACKnowledgement) signal in a case of ARQ (Automatic Repeat Request) or HARQ (Hybrid Automatic Repeat Request) processing on the side of the radio base station.

(4) CINR

In the embodiments of the present invention, the DL-MIMO communication mode of only the radio terminal, in which the CINR is equal to or more than threshold value TH1, is switched to MATRIX-B; however, the present invention is not limited thereto. For example, the DL-MIMO communication mode may be switched to MATRIX-B with regard to only the radio terminal having a history of successful switchover to MATRIX-B, that is, the radio terminal in which the switchover to MATRIX-A is not performed in a short time after the switchover to MATRIX-B.

(5) Rate Information and Others of Radio Terminal

An uplink subframe may contain a message for transmitting control information such as information about a transmission cycle (a ranging cycle) of a ranging signal and rate information of a radio terminal. Herein, the rate information of the radio terminal is information about a message response rate of the radio terminal. Further, the rate information may contain information about a communication rate of the radio terminal and a moving rate of the radio terminal.

It is to be understood that the disclosed embodiments are only illustrative and not restrictive in all respects. The scope of the present invention is interpreted by the appended claims rather than the foregoing description, and it is intended that all kinds of variations are contained in a meaning and a range equivalent to the claims.

REFERENCE SIGNS LIST

1 Radio communication system, 2 First communication apparatus (radio base station), 3, 3a to 3n Second communication apparatus (radio terminal), 4 Communication control apparatus, 10, 11 Antenna, 13 Transmitting unit, 12 Receiving unit, 14 MAC layer processing unit, 15, 20 RF unit, 16 CP removing unit, 17 FFT unit, 18, 23 Subcarrier placing unit, 21 CP adding unit, 22 IFFT unit, 24 Multi-antenna transmitting signal processing unit, 25 Demodulating unit, 26 Decoding unit, 27 User data reception managing unit, 32 Modulating unit, 33 Coding unit, 34 User data transmission managing unit, 35 Controller unit, 41 Communication quality managing unit, 42 Radio resource managing unit, 43 Switchover notifying unit, 44 Transmission wait buffer, 45, 61 to 66 Setting unit, 46 Service flow generating unit, 47 QoS managing unit, 91 Communication level managing unit.

The invention claimed is:

1. A communication apparatus comprising:
a plurality of antennas;
a setting unit for setting a communication mode for different one or more counterpart communication apparatuses to a non-spatial multiplexing mode or a spatial multiplexing mode; and
a transmission processing unit for processing a transmitting signal to the different one or more counterpart communication apparatuses to output the processed signal to said plurality of antennas, on the basis of said set communication mode,
wherein said setting unit switches the setting of the communication mode for said different one or more counterpart communication apparatuses from said non-spatial multiplexing mode to said spatial multiplexing mode, based at least in part on a capability of a communication system comprising the communication apparatus and said different one or more counterpart communication apparatuses, and a minimum reserved traffic rate (MRTR) associated each of at least some of said different one or more counterpart communication apparatuses,
wherein said setting unit switches the setting of the communication mode for said different one or more counterpart communication apparatuses from said non-spatial multiplexing mode to said spatial multiplexing mode, in response to determining that a ratio of a radio resource reserved for service flows associated with each of at least some of said different one or more counterpart communication apparatuses relative to all radio resources exceeds a threshold value.

2. The communication apparatus according to claim 1, further comprising: a resource managing unit for managing a usage condition of a radio resource in radio communication between said communication apparatus and said different one or more counterpart communication apparatuses, wherein said setting unit switches, to said spatial multiplexing mode, the communication mode of at least one of the different one or more communication apparatuses in which the communication mode is said non-spatial multiplexing mode, on the basis of the usage condition of said radio resource.

3. The communication apparatus according to claim 2, wherein in a case where there is no available empty slot in a user data domain of a frame and an amount of data which must be transmitted per unit time exceeds a total amount of data which can be transmitted per unit time on the basis of a slot in said frame, said setting unit switches, to said spatial multiplexing mode, the communication mode of at least one of the different one or more communication apparatuses in which the communication mode is said non-spatial multiplexing mode.

4. The communication apparatus according to claim 3, wherein said setting unit calculates an amount of user data received per unit time by said communication apparatus from a communication control apparatus via a network, as said amount of data which must be transmitted per unit time.

5. The communication apparatus according to claim 1, further comprising: a quality of service (QoS) managing unit for managing QoS of a service flow between said communication apparatus and said different one or more counterpart communication apparatuses, wherein said setting unit switches, to said spatial multiplexing mode, the communication mode of at least one of the different one or more communication apparatuses in which the communication mode is said non-spatial multiplexing mode, on the basis of said QoS.

6. The communication apparatus according to claim 5, further comprising: a service flow generating unit, in a case where a total value of minimum reserved traffic rates of service flows established currently does not exceed a total amount of data which can be transmitted per unit time, for generating a new service flow, wherein in a case where a ratio of the total value of the minimum reserved traffic rates of the service flows established currently to the total amount of data which can be transmitted per unit time exceeds a predetermined threshold value, said setting unit switches, to said spatial multiplexing mode, the communication mode of at least one of the different one or more communication apparatuses in which the communication mode is said non-spatial multiplexing mode.

7. The communication apparatus according to claim 6, wherein said setting unit calculates said total amount of data which can be transmitted per unit time by calculating an amount of data which can be transmitted per unit time with regard to each of the different counterpart communication apparatuses, from a slots count obtained by dividing a total count of slots in a user data domain of a frame by a count of the different counterpart communication apparatuses and summing said calculated amounts of data which can be transmitted per unit time with regard to all the different counterpart communication apparatuses.

8. The communication apparatus according to claim 1, wherein said setting unit switches, to said spatial multiplexing mode, the communication mode of at least one communication apparatus, in which a communication quality is equal to or more than a predetermined value, out of the different one or more communication apparatuses in which the communication mode is said non-spatial multiplexing mode.

9. The communication apparatus according to claim 1, further comprising: a QoS managing unit for managing QoS of a service flow between said communication apparatus and the different one or more counterpart communication apparatuses, wherein said setting unit switches the communication mode of each of said communication apparatuses to said spatial multiplexing mode, on the basis of the QoS of the service flow between the communication apparatus and each of the different communication apparatuses in which the communication mode is said non-spatial multiplexing mode.

10. The communication apparatus according to claim 9, wherein in a case where there is a different communication apparatus which becomes a new counterpart and a total value of maximum sustained traffic rates (MSTRs) of one or more service flows between the communication apparatus and each of the communication apparatuses, in which the communication mode is said non-spatial multiplexing mode, is larger than an amount of data which can be transmitted per unit time with regard to each of said communication apparatuses, said setting unit switches the communication mode of each of said communication apparatuses to said spatial multiplexing mode.

11. The communication apparatus according to claim 9, wherein in a case where there is a different communication apparatus which becomes a new counterpart and a maximum sustained traffic rate (MSTR) of a service flow between the communication apparatus and each of the communication apparatuses, in which the communication mode is said non-spatial multiplexing mode, is equal to or less than an amount of data which can be subjected to transmission processing per unit time with regard to each of said communication apparatuses, said setting unit switches the communication mode of each of said communication apparatuses to said spatial multiplexing mode.

12. The communication apparatus according to claim 9, wherein said setting unit switches the communication mode to said spatial multiplexing mode based at least in part on a limitation on a latency that is tolerated in accordance with the QoS, wherein the limitation comprises when an amount of data that must be transmitted in an α number of consecutive frames starting with a current frame exceeds, by α number of times, an amount of data that can be transmitted in a single frame.

13. The communication apparatus according to claim 9, wherein said setting unit switches, to said spatial multiplexing mode, the communication mode of only the different communication apparatus in which a communication quality is equal to or more than a predetermined value.

14. The communication apparatus according to claim 1, wherein with regard to each of the different communication apparatuses in which the communication mode is said non-spatial multiplexing mode, in a case where transmission wait buffers which can be utilized for each of said different communication apparatuses are full and an amount of data which must be transmitted per unit time exceeds an amount of data which can be transmitted per unit time, said setting unit switches the communication mode to said spatial multiplexing mode.

15. The communication apparatus according to claim 14, wherein said setting unit calculates the amount of data which can be transmitted per unit time with regard to each of said communication apparatuses, from a slots count obtained by dividing a total count of slots in a user data domain of a frame by a count of the different counterpart communication apparatuses.

16. The communication apparatus according to claim 14, wherein said setting unit calculates an amount of user data received per unit time by said communication apparatus from a communication control apparatus via a network and to be transmitted to each of the different communication apparatuses, as said amount of data which must be transmitted per unit time.

17. The communication apparatus according to claim 1, wherein in a case where there is a different communication apparatus which becomes a new counterpart and, with regard to each of the different communication apparatuses in which the communication mode is said non-spatial multiplexing mode, an amount of data which can be transmitted per frame is smaller than a size which can be used per frame out of sizes of transmission wait buffers which can be utilized for each of said communication apparatuses, said setting unit switches the communication mode to said spatial multiplexing mode.

18. The communication apparatus according to claim 17, wherein said setting unit calculates the amount of data which can be transmitted per frame with regard to each of said communication apparatuses, from a slots number obtained by dividing a total count of slots in a user data domain of a frame by a count of the different counterpart communication apparatuses.

19. The communication apparatus according to claim 17, wherein said setting unit calculates a value obtained by dividing the size of the transmission wait buffer which can be utilized for each of said communication apparatuses by a count of frames at retransmission cycles, as the size which can be used per frame.

20. A communication method for a communication apparatus including a plurality of antennas, comprising the steps of: setting a communication mode for different one or more counterpart communication apparatuses to a non-spatial multiplexing mode or a spatial multiplexing mode; and processing a transmitting signal to the different one or more counterpart communication apparatuses to output the processed signal to said plurality of antennas, on the basis of said set communication mode, wherein said setting step includes a step of switching the setting of the communication mode with said different one or more counterpart communication apparatuses from said non-spatial multiplexing mode to said spatial multiplexing mode, in response to determining that a ratio of a radio resource reserved for service flows associated with each of at least some of said different one or more counterpart communication apparatuses relative to all radio resources exceeds a threshold value.

\* \* \* \* \*